(12) United States Patent
Urakabe et al.

(10) Patent No.: US 6,476,568 B2
(45) Date of Patent: Nov. 5, 2002

(54) GAS DISCHARGE LAMP LIGHTING DEVICE

(75) Inventors: Takahiro Urakabe, Tokyo (JP); Akihiko Iwata, Tokyo (JP); Hidehiko Kinoshita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/863,251

(22) Filed: May 24, 2001

(65) Prior Publication Data

US 2002/0070687 A1 Jun. 13, 2002

(30) Foreign Application Priority Data

Dec. 7, 2000 (JP) .......................................... 2000-373347

(51) Int. Cl.[7] .................................................. G05F 1/00
(52) U.S. Cl. ........................ 315/307; 315/225; 315/226; 315/DIG. 7
(58) Field of Search ............................... 315/307, 209 R, 315/224, 225, 226, 209 T, 289, 291, 309, DIG. 2, DIG. 5, DIG. 7

(56) References Cited

U.S. PATENT DOCUMENTS 5,565,743 A * 10/1996 Yamashita ................... 315/308
5,914,566 A * 6/1999 Matsumoto et al. ........ 315/219
5,952,794 A    9/1999 Bergman et al. ............ 315/307
6,008,594 A * 12/1999 Kita et al. ................... 315/247
6,046,551 A *  4/2000 Kita ............................ 315/291

FOREIGN PATENT DOCUMENTS

| JP | 8-195288  | 7/1996 |
| JP | 2000-82592 | 3/2000 |

* cited by examiner

*Primary Examiner*—Don Wong
*Assistant Examiner*—Thuy Vinh Tran
(74) *Attorney, Agent, or Firm*—Leydig, Voit & Mayer, Ltd.

(57) ABSTRACT

A gas discharge lamp lighting device includes a DC/DC converter for adjusting electric power supplied from a power supply to generate and output a DC voltage, and an FET electrically connected to the DC/DC converter, for converting the DC voltage from the DC/DC converter to an AC voltage to be supplied to a gas discharge lamp. A control unit brings the gas discharge lamp to an electrode heating state in which both electrodes of the gas discharge lamp are heated after supplying the AC voltage to the gas discharge lamp. The control unit controls energy supplied to the gas discharge lamp in the electrode heating state according to a voltage across the gas discharge lamp. The control unit brings the gas discharge lamp to an AC discharging state in which an AC current flows through the gas discharge lamp after the energy has been supplied to the gas discharge lamp.

18 Claims, 16 Drawing Sheets

VOLTAGE ACROSS LAMP IN
STEADY DISCHARGING STATUS

VOLTAGE ACROSS LAMP IN
ELECTRODE HEATING STATE

GAS DISCHARGE LAMP LIGHTING DEVICE

BACKGROUND OF THE INVENTION

1. Field of the Invention

The present invention relates to a gas discharge lamp lighting device used as a light source such as a lamp for use with a vehicle display of a projection type.

2. Description of the Prior Art

FIG. 17 is a schematic circuit diagram showing the structure of a prior art gas discharge lamp lighting device as disclosed in Japanese patent application publication (TOKKAIHEI) No. 12-82592. In FIG. 17, reference numeral 1 denotes a direct-current power supply such as a battery, and numeral 2 denotes a DC/DC converter for adjusting electric power supplied from the direct-current power supply 1 and for outputting the adjusted electric power supply. The DC/DC converter 2 includes a transformer 2a, an FET (field effect transistor) 2a, and a diode 2c. Reference numeral 3 denotes a ground, numeral 4 denotes a shunt resistor used for detection of an electric current IL flowing through a gas discharge lamp 12, and numeral 50 denotes an H-type full bridge circuit (referred to as "H-bridge" hereafter) that consists of a plurality of FETs 50a to 50d, and that converts the DC power adjusted by the DC/DC converter 2 to AC power. The gas discharge lamp 12 is driven by the AC power to which the DC power is converted by the H-bridge 50.

Furthermore, reference numeral 13 denotes an interface circuit (referred to as I/F from here on) that accepts a lamp voltage VL from a cathode-side output of the DC/DC converter 2, and that accepts a lamp electric current IL from an H-bridge side end of the shunt resistor 4, and numeral 14 denotes a control circuit for controlling the FET 2b of the DC/DC converter 2 based on the lamp voltage VL and the lamp electric current IL, which are detected successively by way of the I/F 13, and a predetermined circuit impedance so that the electric power supplied to the gas discharge lamp 12 reaches a predetermined value.

In operation, when causing the gas discharge lamp 12 to start to light, the DC/DC converter 2 adjusts the DC electric power supplied from the direct-current power supply 1 and outputs the adjusted. DC electric power, and the H-bridge 50 then converts the adjusted DC electric power from the DC/DC converter 2 to AC power so as to drive the lamp 12. The lamp voltage VL detected at the cathode side of the output of the DC/DC converter 2 is raised up to −400V as shown in FIG. 18. The gas discharge lamp 12 is made to light up after the lamp voltage VL is further increased up to about 20 kV at its peak, and, after that, the lamp is put in a stable lighting status at −90V. In the meanwhile, the DC/DC converter 2 is controlled by the control circuit 14. The control circuit 14 controls the FET 2b of the DC/DC converter 2 based on the lamp voltage VL and the lamp electric current IL, which are detected successively by way of the I/F 13, so that the electric power supplied to the lamp 12 reaches a predetermined value.

After the lamp 12 is made to light up, the control circuit 14 applies the AC voltage to the lamp 12 by alternately Switching between a switching mode of turning on the FETs 50a and 50d of the H-bridge 50 and turning off the other FETs 50b and 50c of the H-bridge 50, and another switching mode of turning off the FETs 50a and 50d of the H-bridge 50 and turning on the other FETs 50b and 50c of the H-bridge 50.

By the way, it is preferable that the electric power supplied to the lamp 12 put in the stable lighting status is 34 watts. The control circuit 14 does not simply control the electric power supplied to the lamp 12 based on only the lamp voltage VL and the lamp electric current IL so that it reaches 34 watts. By estimating the on-resistance of each of the FETs 50a to 50d of the H-bridge 50 in advance so as to make an estimate of the circuit impedance, the control circuit 14 performs the control operation based on the lamp voltage VL, the lamp electric current IL, and the circuit impedance estimated beforehand so that the electric power supplied to the lamp 12 reaches 34 watts even if there is a power loss due to the on-resistance of each of the FETs 50a to 50d of the H-bridge 50.

In the prior art gas discharge lamp lighting device constructed as above, since a high voltage of 400V or less is applied to the H-bridge 50, each of the FETs which constitute the H-bridge 50 has to withstand a high voltage of 400V. The unit price of FETs having such a high voltage breakdown is high, and the above-mentioned H-bridge of the prior art gas discharge lamp lighting device uses as much as four FETs with such a high unit price. The inverter circuit structure, by using the H-bridge as mentioned above, therefore obstructs downsizing of the gas discharge lamp lighting device and a reduction in the cost of the device. A decrease in the number of FETs included in the H-bridge 50 and a reduction in the voltage applied to the H-bridge are therefore challenges for the prior art gas discharge lamp lighting device.

On the other hand, Japanese patent application publication (TOKKAIHEI) No. 8-195288 discloses another prior art gas discharge lamp lighting device for driving a gas discharge lamp by applying AC power to the lamp using two semiconductor switching elements (transistors) and a capacitor without the use of an H-bridge like the above-mentioned H-bridge of FIG. 18. FIG. 19 is a schematic circuit diagram showing the structure of the other prior art gas discharge lamp lighting device. In FIG. 19, reference numeral 61 denotes a gas discharge lamp, numeral 62 denotes a lighting device, numeral 63 denotes a battery, numeral 64 denotes a transistor, numeral 65 denotes a diode, numeral 66 denotes a choke coil, numeral 67 denotes a capacitor, numeral 68 denotes a control circuit, numeral 69 denotes a step-down chopper circuit, numeral 70 denotes a direct-current power supply, numerals 71 and 72 denote transistors, numeral 73 denotes a capacitor, numeral 74 denotes an inverter circuit, numeral 75 denotes an inductor, numeral 76 denotes a start circuit, numeral 77 denotes a lamp voltage detector, numeral 78 denotes a driving circuit, numeral 79 denotes a control unit, numeral 80 denotes a lamp electric current detector, and numeral 81 denotes a detector for detecting electric power applied to the lamp 61.

In operation, electric power from the battery 63 within the direct-current power supply 70 is adjusted by the step-down chopper circuit 69, and is furnished. to the inverter circuit 74. The transistor 71 is turned on and the transistor 72 is turned off in the inverter circuit 74. As a result, an electric current flows from the step-down chopper circuit 69 into the discharge lamp 61 by way of the capacitor 73, and the electric current is then supplied to the gas discharge lamp 61 while the capacitor 73 is charged up. By turning off the transistor 71 and turning on the transistor 72, the electric charge stored in the capacitor 73 is then made to flow to the gas discharge lamp 61 as an electric current flowing in the opposite direction to that of the above-mentioned electric current flowing from the step-down chopper circuit 69 to the gas discharge lamp 61. Thus, by alternately switching between a state in which the capacitor 73 is charged up with the supply of the electric current from the transistor 71 to the gas discharge lamp 61 and another state in which the electric current is supplied from the capacitor 73 to the lamp 61 by turning off the transistor 71 and turning on the transistor 72, an AC current is made to flow into the gas discharge lamp 61.

A problem with the prior art gas discharge lamp lighting device is that when switched into the phase in which the electric current is made to flow from the capacitor 73 to the gas discharge lamp 61 and the polarity of the current flowing through the gas discharge lamp is then reversed, the AC gas discharge can be extinguished and stable lighting cannot be implemented if a voltage higher than required to maintain the AC gas discharge cannot be applied from the capacitor 73 to the gas discharge lamp 61.

Furthermore, the amount of electric charge supplied to the gas discharge lamp 61 changes depending on the length of the time period during which the electric current is supplied to the gas discharge lamp 61 while the capacitor 73 is charged up, and the lamp voltage required to maintain the AC gas discharge changes according to the amount of electric charge supplied to the gas discharge lamp 61. Another problem is thus that when switched from the DC phase to the AC phase, the AC gas discharge can be extinguished easily according to the change in the lamp voltage.

SUMMARY OF THE INVENTION

The present invention is proposed to solve the above-mentioned problems, and it is therefore an object of the present invention to provide a gas discharge lamp lighting device capable of easily lighting a gas discharge lamp, and preventing the gas discharge lamp from being extinguished when causing the lamp to change from an electrode heating state in which both electrodes of the lamp is heated to an AC discharging state in which an AC current flows through the lamp, and the polarity of the current flowing through the lamp is then reversed, and at the beginning of the AC discharging state, by changing the amount of energy to be supplied to the gas discharge lamp placed in the electrode heating state according to a lamp voltage across the lamp.

In accordance with an aspect of the present invention, there is provided a gas discharge lamp lighting device comprising: an electric power adjusting unit for adjusting electric power supplied from a power supply so as to generate and output a DC voltage; a gas discharge lamp driving unit electrically connected to the electric power adjusting unit, for converting the DC voltage from the electric power adjusting unit to an AC voltage to be supplied to a gas discharge lamp; and a control unit for bringing the gas discharge lamp to an electrode heating state in which both electrodes of the gas discharge lamp are heated after supplying the AC voltage to the gas discharge lamp, for controlling an amount of energy to be supplied to the gas discharge lamp placed in the electrode heating state according to a voltage across the gas discharge lamp, and for bringing the gas discharge lamp to an AC discharging state in which an AC current flows through the gas discharge lamp after the amount of energy has been supplied to the gas discharge lamp.

In accordance with a preferred embodiment of the present invention, the gas discharge lamp driving unit can be a switching unit having two output terminals, one of which is connected to one electrode of the gas discharge lamp, and the other of which is connected to another electrode of the gas discharge lamp, for electrically connecting the two output terminals to each other under control of the control unit.

In accordance with another preferred embodiment of the present invention, the gas discharge lamp lighting device further comprises a first capacitor connected between one output terminal of the switching unit and one terminal of the gas discharge lamp which are electrically connected to each other, and a switching element that is connected in parallel to the first capacitor and that is turned on or turned off under control of the control unit. In addition, in order to control the amount of energy to be supplied to the gas discharge lamp in the electrode heating state, the control unit turns on the switching element and supplies a predetermined amount of energy to the gas discharge lamp, and, after that, turns off the switching element to charge up the first capacitor and brings the gas discharge lamp to the AC discharging state when a voltage across the first capacitor reaches a predetermined voltage.

In accordance with another preferred embodiment of the present invention, the gas discharge lamp lighting device further comprises an initial current supplying unit electrically connected between the electric power adjusting unit and the gas discharge lamp driving unit, for supplying an initial current to the gas discharge lamp when the gas discharge lamp starts to discharge. Preferably, the initial current supplying unit can be either a series circuit in which a first resistor and a diode connected in parallel to each other, a capacitor, and a second resistor are connected in series to each other, or a series circuit in which a parallel circuit in which a first resistor and a series circuit having a second resistor and a diode connected in series to each other are connected in parallel to each other, and a capacitor are connected in series to each other. Preferably, the second resistor has a resistance value ranging from $2\Omega$ to $100\Omega$.

In accordance with another preferred embodiment of the present invention, the gas discharge lamp lighting device further comprises an igniter circuit for generating a high voltage based on the DC voltage from the electric power adjusting unit when the gas discharge lamp starts to discharge, and for applying the high voltage to the gas discharge lamp.

In accordance with another preferred embodiment of the present invention, the control unit detects the voltage across the gas discharge lamp when the gas discharge lamp is placed in the AC discharging state so as to control the amount of energy to be supplied to the gas discharge lamp that will be lighted up the next time and that will be placed in the electrode heating state according to the detected voltage. As an alternative, the control unit can detect the voltage across the gas discharge lamp when the gas discharge lamp is placed in the electrode heating state so as to control the amount of energy to be supplied to the gas discharge lamp according to the detected voltage.

In accordance with another preferred embodiment of the present invention, the gas discharge lamp lighting device further comprises a high voltage generating unit for generating and applying a high voltage to the gas discharge lamp so as to prevent the gas discharge lamp from being extinguished when the control unit causes the gas discharge lamp to change from the electrode heating state to the AC discharging state. Preferably, the high voltage generating unit can include a second capacitor connected in parallel to the switching element, and an inductor connected in series to the first capacitor, and a series circuit including the first capacitor and the inductor is connected in parallel to both the switching element and the second capacitor.

In accordance with another aspect of the present invention, there is provided a gas discharge lamp lighting device comprising: an electric power adjusting unit for adjusting electric power supplied from a power supply so as to generate and output a DC voltage; a switching unit electrically connected to the electric power adjusting unit and having two output terminals, one of which is connected to one electrode of a gas discharge lamp, and the other of which is connected to another electrode of the gas discharge lamp, for electrically connecting the two output terminals to each other in response to a control signal applied thereto, and for converting the DC voltage from the electric power adjusting unit to an AC voltage to be supplied to the gas discharge lamp; a first capacitor connected between one output terminal of the switching unit and one terminal of the gas discharge lamp which are electrically connected to each other; a control unit for charging up the first capacitor while supplying the DC voltage to the gas discharge lamp so as to make it discharge, and for stopping the supply of the DC voltage to the gas discharge lamp before bringing the gas discharge lamp to an AC discharging state in which an AC current flows through the gas discharge lamp, and then delivering the control signal to the switching unit so as to supply energy stored in the first capacitor to the gas discharge lamp; and a high voltage generating unit for generating and applying a high voltage to the gas discharge lamp so as to prevent the gas discharge lamp from being extinguished when the control unit performs the control operation so as to supply the energy stored in the first capacitor to the gas discharge lamp.

In accordance with an preferred embodiment of the present invention, the gas discharge lamp lighting device further comprises a switching element that is connected in parallel to the first capacitor and that is turned on or turned off under control of the control unit. In addition, the high voltage generating unit includes a second capacitor connected in parallel to the switching element, and an inductor connected in series to the first capacitor, and a series circuit including the first capacitor and the inductor is connected in parallel to both the switching element and the second capacitor. Preferably, the high voltage generating unit further includes a saturable reactor connected in series to the inductor.

In accordance with another preferred embodiment of the present invention, the high voltage generating unit includes a second capacitor having a capacitance value smaller than that of the first capacitor and having two electrodes electrically connected to both electrodes of the gas discharge lamp, respectively, and an inductor connected in series to the first and second capacitors. Preferably, the high voltage generating unit further includes a saturable reactor connected in series to the inductor.

In accordance with another preferred embodiment of the present invention, the control unit brings the gas discharge lamp to an electrode heating state in which both electrodes of the gas discharge lamp are heated after the gas discharge lamp starts to discharge, controls an amount of energy to be supplied to the gas discharge lamp placed in the electrode heating state according to a voltage across the gas discharge lamp, and brings the gas discharge lamp to an AC discharging state in which an AC current flows through the gas discharge lamp after the controlled amount of energy has been supplied to the gas discharge lamp.

In accordance with another preferred embodiment of the present invention, the gas discharge lamp lighting device further comprises a switching element that is connected in parallel to the first capacitor and that is turned on or turned off under control of the control unit. In addition, in order to control the amount of energy to be supplied to the gas discharge lamp in the electrode heating state, the control unit turns on the switching element and supplies a predetermined amount of energy to the gas discharge lamp, and, after that, turns off the switching element to charge up the first capacitor and brings the gas discharge lamp to the AC discharging state when a voltage across the first capacitor reaches a predetermined voltage. Preferably, the control unit detects the voltage across the gas discharge lamp when the gas discharge lamp is placed in the AC discharging state so as to control the amount of energy to be supplied to the gas discharge lamp that will be lighted up the next time and that will be placed in the electrode heating state according to the detected voltage. As an alternative, the control unit can detect the voltage across the gas discharge lamp when the gas discharge lamp is placed in the electrode heating state so as to control the amount of energy to be supplied to the gas discharge lamp according to the detected voltage.

Further objects and advantages of the present invention will be apparent from the following description of the preferred embodiments of the invention as illustrated in the accompanying drawings.

BRIEF DESCRIPTION OF THE DRAWINGS

FIG. 7 is a graph showing the required amount of electric charge to be supplied to the gas discharge lamp in the electrode heating state versus the lamp voltage Vk(=VL−Vc) across the lamp in the electrode heating state after a power supply is turned on;

DETAILED DESCRIPTION OF THE PREFERRED EMBODIMENTS

Embodiment 1

Figure 1:
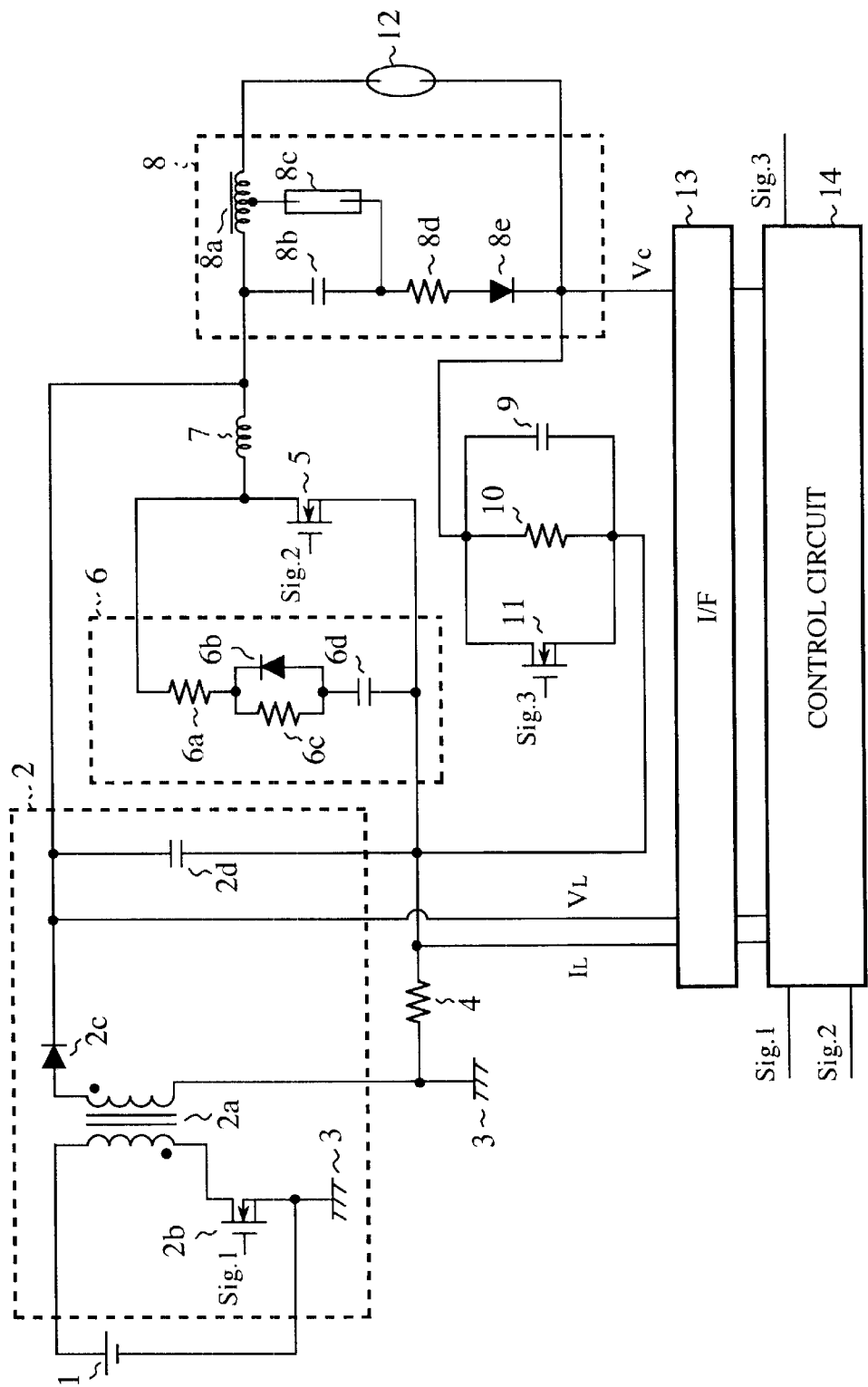
FIG. 1 is a schematic circuit diagram showing the structure of a gas discharge lamp lighting device according to a first embodiment of the present invention.

FIG. 1 is a schematic circuit diagram showing the structure of a gas discharge lamp lighting device according to a first embodiment of the present invention. In FIG. 1, reference numeral 1 denotes a direct-current (DC) power supply, numeral 2 denotes a DC/DC converter, numeral 2a denotes a transformers numeral 2b denotes an FET that is a switching element, numeral 2c denotes a diode, numeral 2d denotes a capacitor having a function of feeding an electric current into a gas discharge lamp 12 when the gas discharge lamp is made to start to discharge, and a function of smoothing an output voltage of the DC/DC converter 2, and numeral 3 denotes a ground. The DC/DC converter 2 includes the transformer 2a, the FET 2b, the diode 2c, the capacitor 2d, and the ground 3. Reference numeral 4 denotes a shunt resistor for converting a lamp electric current that flows through the gas discharge lamp 12 to a voltage, numeral 5 denotes an FET that is a switching element, numeral 6 denotes, a start assistance circuit, 6a denotes a resistor having a resistance value of several ohms to several tens of ohms, numeral 6b denotes a diode, numeral 6c denotes a resistor having, a resistance value of several kiloohms to several tens of kiloohms, and numeral 6d denotes a capacitor. The start assistance circuit 6 includes the resistor 6a, the diode 6b, the resistor 6c, and the capacitor 6d. Reference numeral 7 denotes an inductor that serves as a noise cut-off filter, numeral 8 denotes an igniter circuit for applying a high voltage of about 20 kV to the gas discharge lamp 12 when the gas discharge lamp is made to start to discharge, numeral 8a denotes a pulse transformer of winding ratio 1:100, numeral 8b denotes a capacitor for storing energy required for making the gas discharge lamp to start to discharge, numeral 8c denotes a gap switch that is brought into conduction when a voltage of 400V is applied thereto, numeral 8d denotes a resistor having a resistance value of several kiloohms to several tens of kiloohms, for determining the length of time required for the gas discharge lamp to start to discharge after the device is switched on, and numeral 8e denotes a diode for backflow prevention. The igniter circuit 8 includes the pulse transformer 8a, the capacitor 8b, the gap switch 8c, the resistor 8d, and the diode 8e. Reference numeral 9 denotes an electrolytic capacitor having a capacitance value of several microfarads to several hundreds of microfarads, numeral 10 denotes a resistor for protection, and numeral 11 denotes an FET that is a switching element, for removing an electric charge stored in the capacitor 9, VL denotes the output voltage of the DC/DC converter 2, Vc denotes a voltage across the capacitor 9, numeral 13 denotes an interface circuit (referred to as I/F hereafter) for converting the lamp current IL that flows through the gas discharge lamp 12 to a signal of 0V to 5V, and numeral 14 denotes a control circuit for controlling the plurality of switching elements 2b, 5, and 11 according to VL, Vc, and IL applied thereto from the I/F 13 so that each of the switching elements 2b 5, and 11 is switched between the on and off states.

As shown in FIG. 1, a positive electrode of the direct-current power supply 1 is connected to a winding end side terminal of a primary winding of the transformer 2a, which is an input terminal of the DC/DC converter 2. A winding start side terminal, which is marked with "." in the figure, of the primary winding of the transformer 2a is connected to a drain of the FET 2b. The ground 3 is connected to a source of the FET 2b and a negative electrode of the direct-current power supply 1. A node between the source of the FET 2b and the negative electrode of the direct-current power supply 1 is another input terminal of the DC/DC converter 2. A control signal Sig.1 from the control circuit 14 is applied to a gate of the FET 2b. A winding start side terminal, which is marked with "." in the figure, of a secondary winding of the transformer 2a is connected to an anode of the diode 2c, and a winding end side terminal of the secondary winding of the transformer 2a is connected to the ground 3. A cathode of the diode 2c is connected to an electrode of the capacitor 2d, a terminal of a primary winding of the pulse transformer 8a within the igniter circuit 8, an electrode of the capacitor 8b within the igniter circuit 8, and a terminal of the inductor 7. A node between the cathode of the diode 2c and the electrode of the capacitor 2d is an output terminal of the DC/DC converter 2. A node between the winding end side terminal of the secondary winding of the transformer 2a and the ground 3 is another output terminal of the DC/DC converter 2.

The inductor 7 has another terminal connected to a drain of the FET 5 and a terminal of the resistor 6a within the start assistance circuit 6. Another terminal of the resistor 6a is connected to a cathode of the diode 6b and a terminal of the resistor 6c. Another terminal of the resistor 6c is connected to an anode of the diode 6b and a terminal of the capacitor 6d. Both another terminal of the capacitor 6d and a source of the FET 5 are connected to a terminal of the shunt resistor 4. Another terminal of the shunt resistor 4 is connected to the ground 3. A control signal Sig.2 from the control circuit 14 is applied to a gate of the FET 5. The FET 5 constitutes a switching unit. The terminal of the inductor 7, which is connected to the cathode of the diode 2c and the terminal of the primary winding of the pulse transformer 8a within the igniter circuit 8, serves as both an input terminal and an output terminal of the switching unit. A node between the source of the FET 5 and the terminal of the shunt resistor 4 serves as both another input terminal and another output terminal of the switching unit.

Another terminal of the primary winding of the pulse transformer 8a within the igniter circuit 8 is connected to a terminal of a secondary winding of the pulse transformer 8a and an electrode of the gap switch 8c. Another electrode of the gap switch 8c is connected to an electrode of the capacitor 8b, which is not the pulse-transformer-side electrode connected to the pulse transformer 8a, and a terminal of the resistor 8d. Another terminal of the resistor 8d is connected to an anode of the diode 8e. A cathode of the diode 8e is connected to an electrode of the gas discharge lamp 12. Another electrode of the gas discharge lamp 12 is connected to another terminal of the secondary winding of the pulse transformer 8a, which is not the gap-switch-side terminal connected to the gap switch 8c.

A node between the electrode of the gas discharge lamp 12 and the cathode of the diode 8e within the igniter circuit 8 is connected to a terminal of the capacitor 9, a terminal of the resistor 10, and a drain of the FET 11. Both another terminal of the capacitor 9 and another terminal of the resistor 10 are connected to a source of the FET 11, and is also connected to the ground 3 by way of the shunt resistor 4. A control signal, Sig.3 from the control circuit 14 is applied to a gate of the FET 11.

The output voltage VL of the DC/DC converter 2 which is the one that appears at the cathode of the diode 2c is detected. The voltage Vc across the capacitor 9 is also detected. The electric current IL is obtained by conversion of the lamp current that flows through the gas discharge lamp 12 to a voltage by means of the shunt resistor 4. The detected voltage VL, the detected voltage Vc, and the detected voltage corresponding to the electric current IL are all input to the I/F 13. These voltages are converted into signals of 0V to 5V, which can be handled by the control circuit 14, by the I/F 13, and are processed by the control circuit 14. The control circuit 14 controls the plurality of FETs 2b, 5, and 11 by delivering the control signals Sig.1, Sig.2, and Sig.3, which are generated according to reference values set beforehand in the control circuit 14, to the plurality of FETs 2b, 5, and 11.

Figure 2:
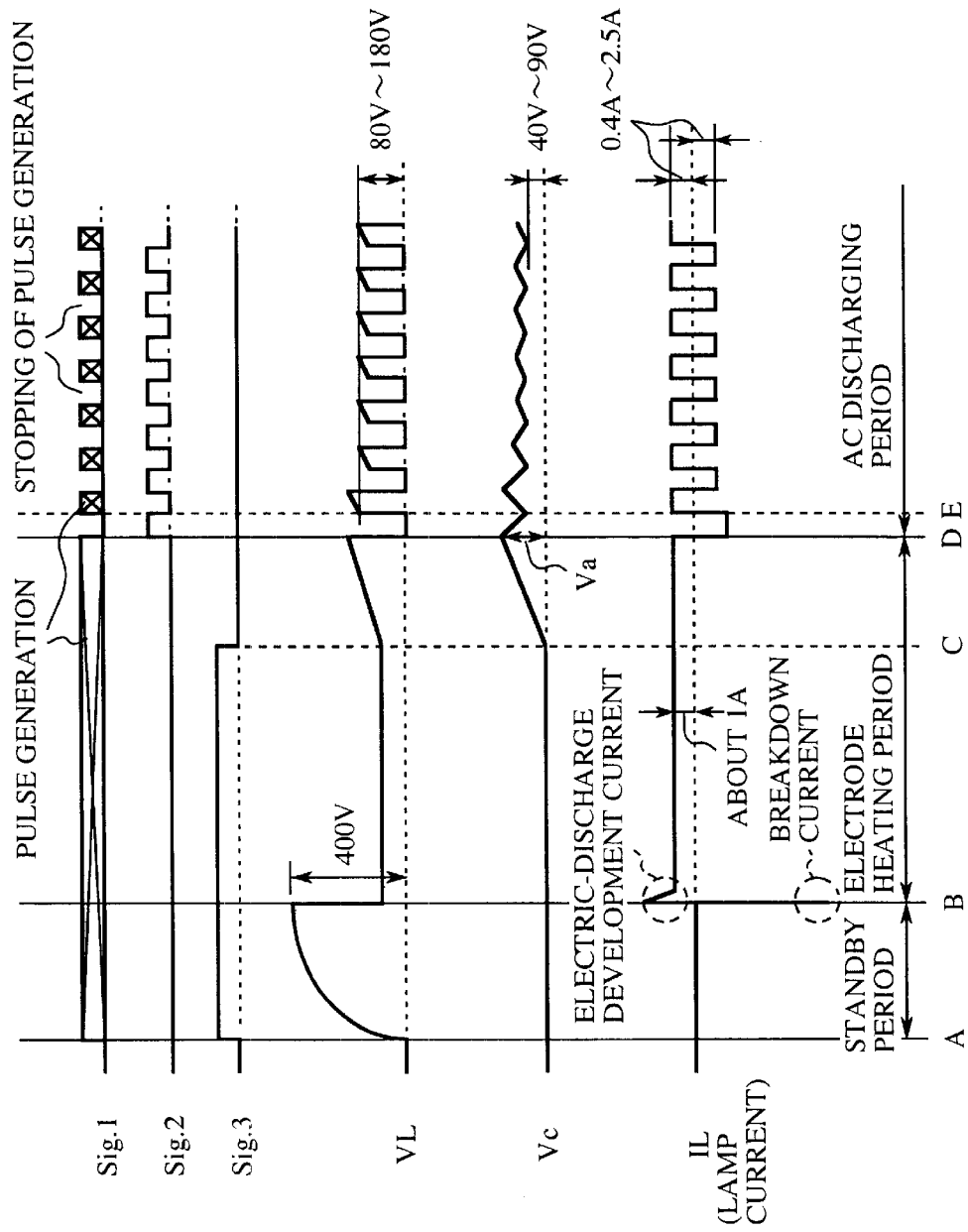
FIG. 2 is a timing chart showing the waveforms of control signals generated by a control circuit of the gas discharge lamp lighting device of FIG. 1, a output voltage VL of a DC/DC converter, a voltage Vc that appears at one electrode of a gas discharge lamp, which is connected to an electrolytic capacitor, and an electric current IL flowing through the lamp.

FIG. 2 is a timing chart showing the waveforms of the control signals Sig.1, Sig.2, Sig.3, and the detected voltages VL, Vc, and the detected electric current IL. When electric power is supplied to the gas discharge lamp lighting device, the control circuit 14 causes the control signal Sig.3 to make a low-to-high transition so as to turn on the FET 11, and also causes the control signal Sig.2 to make a high-to-low transition so as to turn off the FET 5 (at A of FIG. 2). The other control Sig.1 is a series of pulses of a frequency of 100 kHz. The control circuit 14 controls the control signal Sig.1 by comparing the detected voltage VL with a corresponding reference voltage preset beforehand. The control circuit 14 raises the voltage VL monotonously up to 400V by controlling the gate of the FET 2b of the DC/DC converter 2 so that the capacitor 2d is charged up. At that time, the capacitor 8b connected in parallel to the gap switch 8c and the capacitor 6d within the start assistance circuit 6 are also charged up simultaneously. The time period from A to B of FIG. 2 will be referred to as standby period hereafter.

When the voltages across the capacitors 2d, 8b, and 6d reach 400V, the gap switch 8c is brought into conduction and a large electric current flows through the primary winding of the pulse transformer 8a, and a high voltage of about 20 kV appears at the secondary winding of the pulse transformer 8a. An electric current (i.e., breakdown electric current) with a high peak and a short, pulse width then flows through the gas discharge lamp 12, and the gas discharge lamp starts to discharge (at B of FIG. 2). At the same time that the voltage across the gas discharge lamp 12 (since Vc=0 in this case as described below, the voltage across the gas discharge lamp 12 is equal to VL) decreases rapidly after the gas discharge lamp 12 starts to discharge, the electric charge stored in the capacitor 2d of the DC/DC converter 2 and the electric charge stored in the capacitor 6d of the start assistance circuit 6 flow into the gas discharge lamp 12 (those electric charges cause an electric current flowing through the gas discharge lamp 12, which is called "discharge development electric current"), thereby maintaining the electric discharge of the lamp. The electric charge from the capacitor 6d is made to pass through the resistor 6a of about 10Ω in order to introduce a little time lag into the electric current. The advantage of the introduction of a time lag into the electric current will be described later. After that, the electric current of about 1 A keeps being supplied to the gas discharge lamp 12 by the DC/DC converter 2. At this time, since the FET 11 is switched on, the voltage (Vc) across the both electrodes of the capacitor 9 is 0V.

After feeding a predetermined amount of electric charge into the gas discharge lamp 12, i.e., when supplying a predetermined amount of energy to the gas discharge lamp 12, the control circuit 14 causes the control signal Sig.3 to make a high-to-low transition so as to turn off the FET 11 and to charge up the capacitor 9 by way of the gas discharge lamp 12 discharging while supplying energy to the gas discharge lamp 12 (at C of FIG. 2). In the meanwhile, the voltage Vc rises during this time period as the capacitor 9 is charged up. After a predetermined amount of energy is further supplied to the gas discharge lamp 12 and the voltage Vc reaches a predetermined voltage, the control circuit causes the gas discharge lamp 12 to change to the next process (AC discharging period described below) (at D of FIG. 2). The above-mentioned time period from B to D of FIG. 2 during which the DC electric current keeps flowing through the gas discharge lamp 12 will be referred to as electrode heating period (i.e., electrode heating state) hereafter. During the electrode heating period, the both electrodes of the gas discharge lamp 12 are heated and the discharge voltage is decreased adequately, thereby causing the gas discharge lamp to discharge smoothly after that. The predetermined value (i.e., Va of FIG. 2) of Vc is equal to the sum of the lamp voltage (VL–Vc) across the gas discharge lamp and 10V to 50V. A required amount of electric charge to be supplied to the gas discharge lamp 12 during the electrode heating period will be described later. It is understood from the above-mentioned explanation that the FET 11 plays an important role in freely setting the amount of energy to be supplied to the gas discharge lamp 12 during the electrode heating period.

When the voltage Vc reaches the predetermined value preset in the control circuit 14 (Va. of FIG. 2), the control circuit 14 causes the control signal Sig.1 to make a high-to-low transition so as to turn off the FET 2b of the DC/DC converter 2 to stop the DC/DC converter, and simultaneously causes the control signal Sig. 2 to make a low-to-high transition to turn on the FET 5 (at D of FIG. 2). As a result, the energy stored in the capacitor 9 flows into the gas discharge lamp 12. An electric-discharge current having a polarity opposite to that of the DC electric current flowing during the preceding time period (i.e., electrode heating period) then flows through the gas discharge lamp 12. Since the capacitor 9 is an electrolytic capacitor having a large electrostatic capacity of 100 $\mu$F, and sufficient energy has been stored in the capacitor 9 during the electrode heating period, the capacitor 9 has the ability to make a discharge current flow through the gas discharge lamp.

After supplying the electric current from the capacitor 9 to the gas discharge lamp 12 during a fixed time period, the control circuit 14 turns off the FET 5 again by causing the control signal Sig.2 to make a high-to-low transition (at E of FIG. 2), and then supplies a series of pulses of a frequency of 100 kHz as the control signal Sig.1 to the DC/DC converter 2 to activate the DC/DC converter 2 and to supply an amount of electric charge to the gas discharge lamp 12. After that, the control signal Sig.2 is caused to make a high-to-low or low-to-high transition and the generation of a series of pulses as the control signal Sig. 1 is repeated at a repetition rate of 200 Hz or more. This time period will be referred to as AC discharging period (i.e., AC discharging state) from now on. The control circuit 14 controls the electric power to be supplied to the gas discharge lamp by comparing the electric current output IL, the voltage output, VL, Vc, with their respective reference values. After the gas discharge lamp enters the AC discharging state, the control circuit 14 controls the FET 2b of the DC/DC converter 2 using the control signal Sig.1 so that the electric power reaches 34 watts promptly.

During the AC discharging period, when the control signal Sig.2 is in a high state and the FET 5 is turned on, as mentioned above, the generation of a series of pulses as Sig.1 is stopped and the DC/DC converter 2 is therefore stopped. Furthermore, the other control signal Sig.3 is held in a low state and the FET 11 is therefore in the off state throughout the AC discharging period. Immediately after the gas discharge lamp 12 lights up, the lamp voltage is about 40V. The lamp voltage then increases up to about 90V after a lapse of 1 minute.

The purpose of making the time period during which the DC/DC converter 2 operates (i.e., the time period during which a series of pulses is generated as Sig.1) not overlap the time period during which the FET 5 is tuned on is to prevent a short-circuit current from being generated because the short-circuit current flows from the DC/DC converter 2 to the ground 3 by way of the FET 5 and a power loss is therefore generated otherwise.

When turning off the gas discharge lamp, the control circuit 14 stops the voltage supply from the power supply 1 (power supply OFF). Even when the power supply is turned off, a voltage for driving the control circuit is held at a while because capacitors (not shown) are provided in the control circuit. In other words, even after the power supply is turned off, the control circuit 14, can control the FETs 2b, 5, and 11 for a while. When the power supply is turned off, the control circuit 14 causes the control signal Sig.1 applied to the FET 2b to make a high-to-low transition so as to stop the DC/DC converter 2, and simultaneously causes the control signal Sig.2 applied to the FET 5 to make a low-to-high transition so as to turn on the FET 5. The control circuit 14 thus decreases the voltage across the capacitor 9 while supplying energy from the capacitor 9 to the gas discharge lamp 12. When the voltage across the capacitor 9 reaches about 40V, the electric discharge cannot be maintained and the gas discharge lamp therefore enters a state of non-lighting. By causing the other control signal Sig. 3 applied to the FET 11 to make a low-to-high transition so as to turn on the FET 11, the control circuit 14 discharges the electric charge of about 40V which has remained in the capacitor 9 by way of the FET 11 and reduces the voltage across the capacitor 9 to 0V. The lamp turning off operation is thus completed.

It is possible to freely set the amount of energy to be continuously supplied to the gas discharge lamp by adjusting the length of the time period during which the FET 11 is switched on during the electrode heating period. It is needless to say that the setting of the amount of energy to be supplied to the gas discharge lamp by using the FET. 11 is useful in not only the circuit structure of the first embodiment but also a prior art general gas discharge lamp lighting device including a half bridge circuit, as described above.

Figure 3:
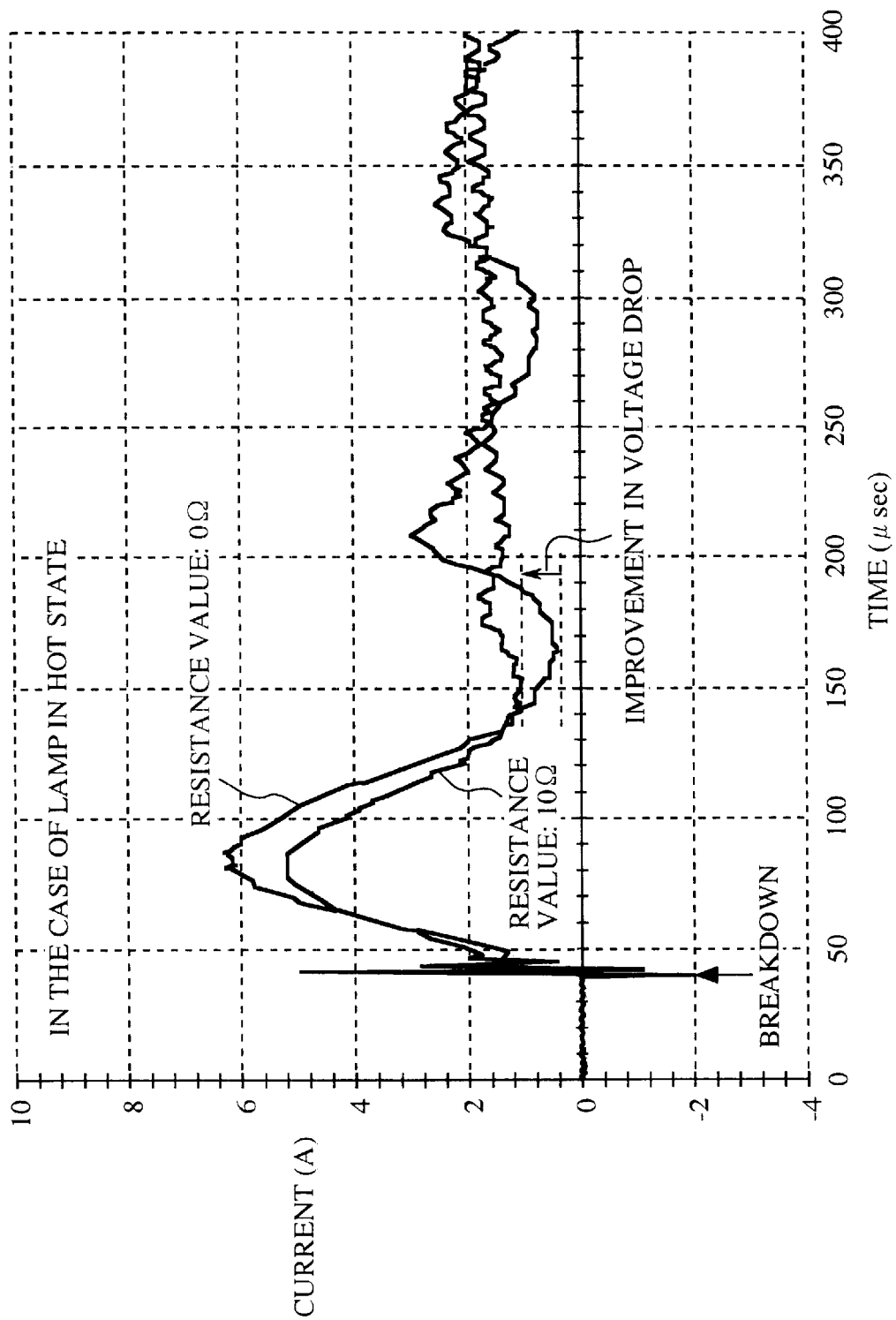
FIG. 3 is a graph showing a discharge development electric current flowing through the lamp in the case that a resistor of a start assistance circuit of the gas discharge lamp lighting device of FIG. 1 has a resistance value of 0Ω, and the discharge development electric current flowing through the lamp in the case that the resistor has a resistance value of 10Ω.

Here, the effect of the resistor 6a of the start assistance circuit 6 will be described. As mentioned above, the resistor 6a can introduce a time lag into the discharge development electric current. FIG. 3 is a graph showing the discharge development electric current flowing through the gas discharge lamp in the case that the resistor 6a has a resistance value of 0$\Omega$, and the discharge development electric current flowing through the gas discharge lamp in the case that the resistor 6a has a resonate value of 10$\Omega$. FIG. 3 shows the discharge development electric current flowing through the gas discharge lamp which was turned off after it had lighted up for a while, and, immediately after that (after a lapse of 10 to 20 seconds), is made to light up again When the gas discharge lamp is made to light up soon after the gas discharge lamp has been turned off, the lighting is started while the metallic vapor within the gas discharge lamp is held at a high pressure and the impedance of the gas discharge lamp is large, and therefore the discharge development electric current cannot easily flow and decreases rapidly, as shown in FIG. 3. If the discharge development electric current decreases largely, the electric discharge might be extinguished and this results in a lighting failure. The state in which the gas discharge lamp is placed immediately after the gas discharge lamp has been turned off will be referred to as hot state from here on. On the other hand, since the impedance of the gas discharge lamp is small when the gas discharge lamp starts to light up after it has not lighted up for a while, the electric current can be easily supplied to the gas discharge lamp from the DC/DC converter and therefore the discharge development electric current cannot decrease largely. The state in which the gas discharge lamp has not lighted up for a while will be referred to as cold state from here on.

As can be seen from FIG. 3, the large decrease in the discharge development electric current in the case where the gas discharge lamp placed in the hot state starts to light up is improved by setting the resistance value of the resistor 6a to 10Ω. While the smallest amount of discharge development electric current is 0.4 A when the resistance value of the resistor 6a is 0Ω, the smallest amount of discharge development electric current is 1.0 A when the resistance value of the resistor 6a is 10Ω. It is possible to keep the discharge development electric current at a higher level until the DC/DC converter is started by introducing a time lag into a component of the discharge development electric current flowing from the capacitor 6d to the gas discharge lamp after the electric discharge has been started, and it is also possible to reduce the decrease in the discharge development electric current (i.e., increase the smallest amount of discharge development electric current up to 1 A). It is understood from the above description thee method of inserting a resistor of several ohms to several tens of ohms into the electric discharge path of the start assistance circuit (the path via which the charge stored in the capacitor 6d is discharged) is effective in preventing a failure of lighting. In the case of setting the resistance value of the resistor 6a to 1 kΩ or more, it is determined by experiment that the discharge development electric current becomes small too much and the electric discharge has been extinguished, and this results in a failure of lighting. It is also determined by experiment that, in order to supply enough energy for the discharge development, and to increase the smallest amount of discharge development electric current up to 0.5 A or more, the resistor 6a has to have a resistance value of 2Ω to 100Ω. It is further determined that as long as the resistor 6a has a resistance value ranging from 2Ω to 1 kΩ, there is no problem on practical use.

As shown in FIG. 1, the start assistance circuit 6 is a series circuit in which the parallel circuit comprised of the resistor 6c and the diode 6b connected in parallel to each other, the capacitor 6d, and the other resistor 6a are connected in series. As an alternative, the start assistance circuit 6 can be a series circuit in which a parallel circuit comprised of a series circuit including a diode and a resistor connected in series to each other, and another resistor, which are connected in parallel to each other, and a capacitor are connected in series to each other.

As previously mentioned, the electric discharge path of the start assistance circuit includes a resistor inserted thereinto so as to introduce a time lag into the discharge development electric current, thereby preventing the large decrease in the discharge development electric current flowing through the gas discharge lamp placed in the hot state when it is made to light up, and hence preventing a lighting failure from occurring. Needless to say, it is possible to apply the structure of the start assistance circuit to a general gas discharge lamp lighting device including either a half bridge circuit or a full bridge circuit.

Next, the required amount of electric charge (energy amount) to be supplied to the gas discharge lamp placed in the electrode heating state will be described. The purpose of continuously supplying a certain amount of energy to the gas discharge lamp (supplying DC power to the gas discharge lamp) during the electrode heating period is to heat the both electrodes of the gas discharge lamp, to decrease the lamp voltage, to cause an electric discharge surely when causing the gas discharge lamp to change from the electrode heating state to the AC discharging state, and at the beginning of the AC discharging period, thus preventing the gas discharge lamp from being extinguished. Therefore, during the electrode heating period a larger amount of energy has to be supplied to the gas discharge lamp placed in the cold state than that to be supplied to the gas discharge lamp placed in the hot state. When the gas discharge lamp is made to transition from the electrode heating state to the AC discharging state and the polarity of the electric-discharge current flowing through the gas discharge lamp is therefore reversed, the gas discharge extinction phenomenon cannot occur in the gas discharge lamp if it is placed in the hot state. In contrast, the gas discharge extinction phenomenon often occurs in a lamp placed in the cold state when the gas discharge lamp is made to transition from the electrode heating state to the AC discharging state and the polarity of the electric-discharge current flowing through the gas discharge lamp is therefore reversed. Especially, the gas discharge extinction phenomenon often occurs in an old lamp placed in the cold state whose electrodes wear out when the polarity of the current flowing through the gas discharge lamp is reversed, because the voltage across the old lamp put in a steady discharging status is high.

Figure 4:
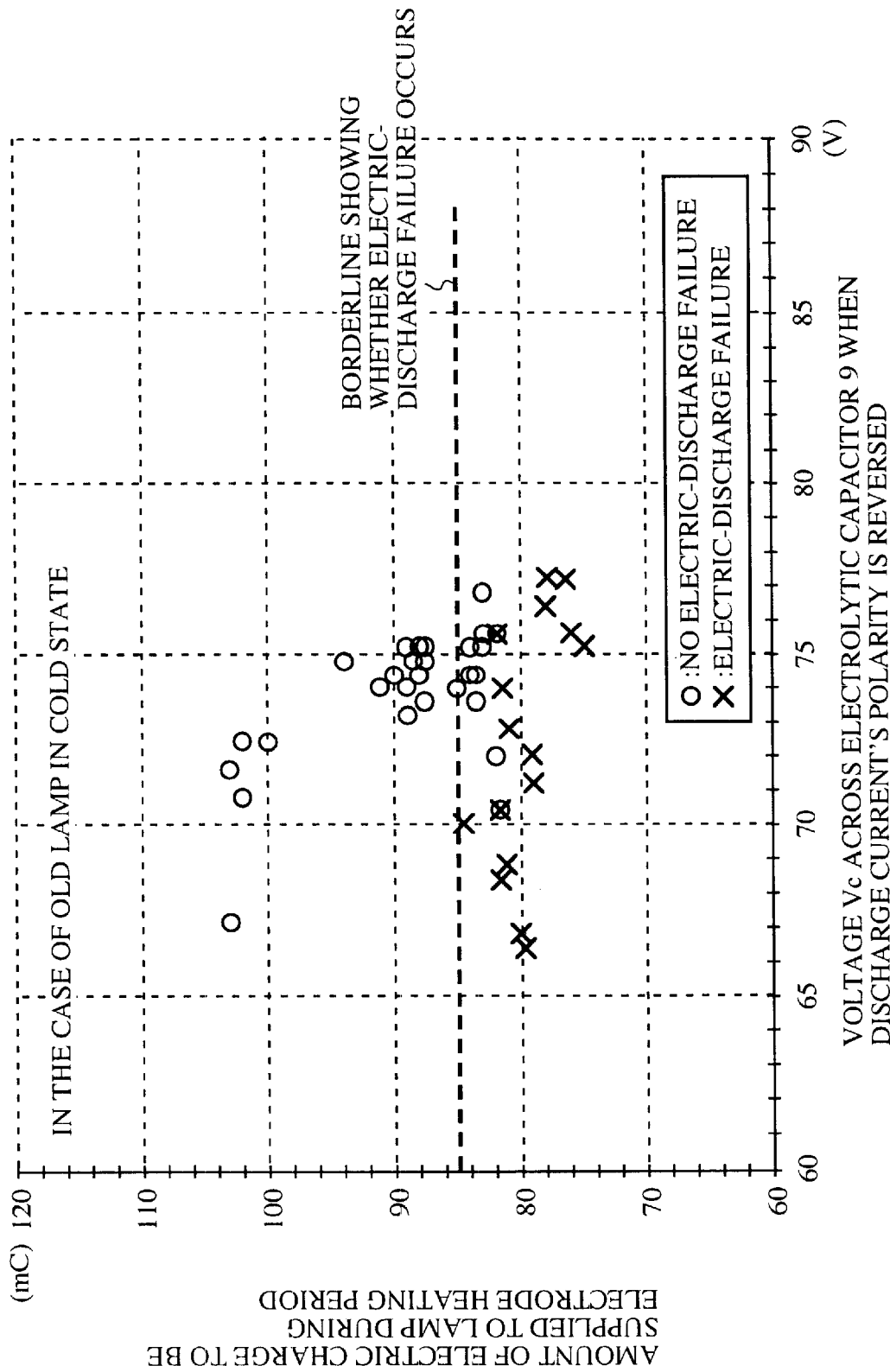
FIG. 4 is a graph showing results of observing a gas discharge extinction phenomenon that occurs when an old lamp put in a cold status is made to change from an electrode heating state to an AC discharging state and the polarity of an electric-discharge current flowing through the old lamp is then reversed.
Figure 5:
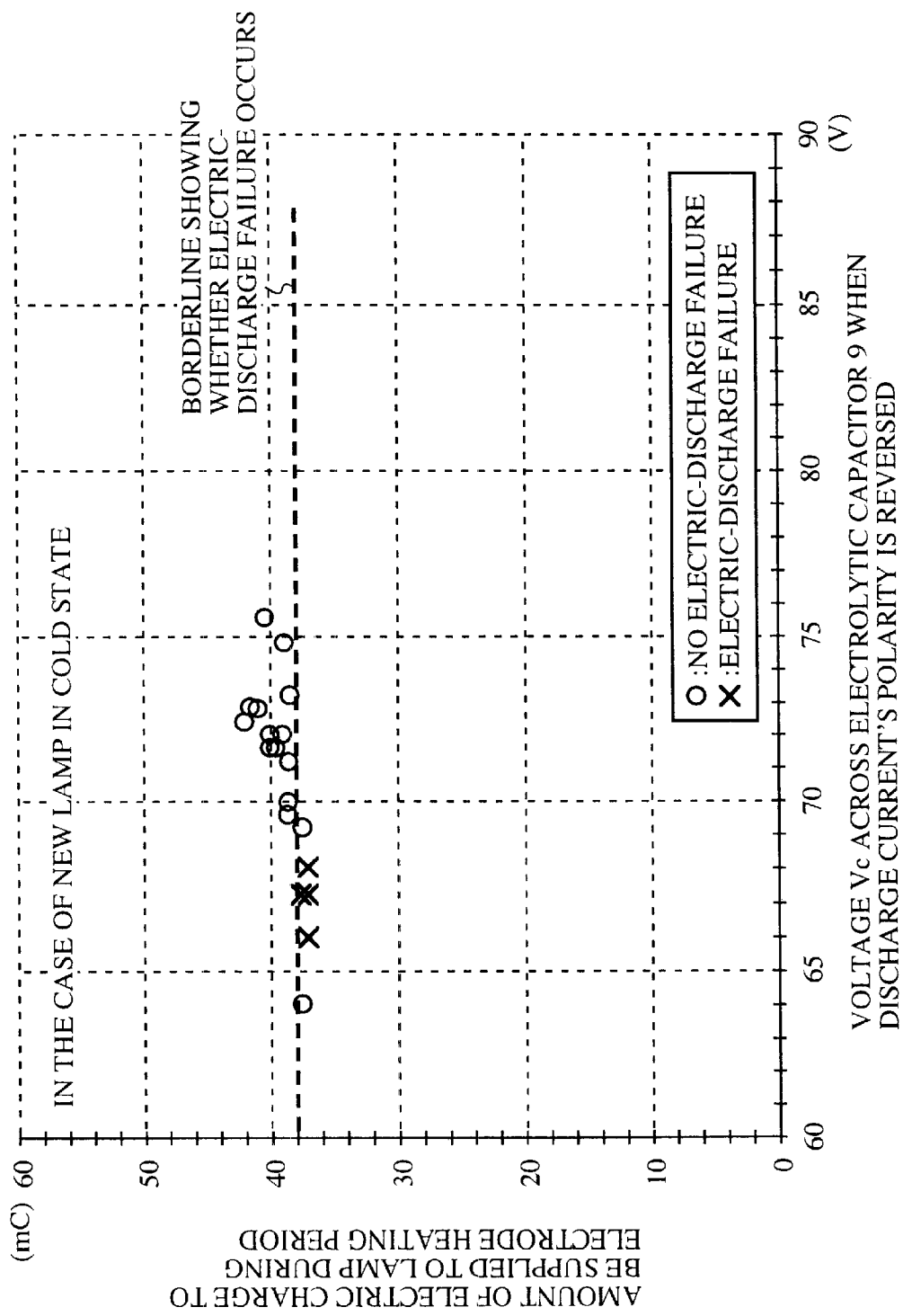
FIG. 5 is a graph showing results of observing the gas discharge extinction phenomenon that occurs when a new lamp put in a cold status is made to change from the electrode heating state to the AC discharging state and the polarity of the electric-discharge current flowing through the old lamp is then reversed.

FIGS. 4 and 5 show results of observing the gas discharge extinction phenomenon when the gas discharge lamp 12 is made to change from the electrode heating state to the AC discharging state and the polarity of the electric-discharge current flowing through the gas discharge lamp is therefore reversed. The results shown in FIGS. 4 and 5 are obtained by testing lamps in the cold state. FIG. 4 shows the result of an old lamp in the cold state, and FIG. 5 shows the result of a new lamp in the cold state. A new lamp is a lamp whose electrodes are not worn out much and whose voltage is low when the gas discharge lamp is put in a steady discharging state (in which the gas discharge lamp is held at a constant temperature after a lapse of 30 seconds to 1 minute since the gas discharge lamp entered the AC discharging state). The horizontal axis shows the voltage across the capacitor 9 when the polarity of the electric discharge current is reversed, and the vertical axis shows the electric charge supplied to the gas discharge lamp during the electrode heating period. ○ shows a case where the gas discharge extinction phenomenon does not occur (no failure of electric discharge), and X shows a case where the gas discharge extinction phenomenon occurs (a failure of electric discharge). A broken line in the figure shows a borderline that divides the experimental results to the cases where the gas discharge extinction phenomenon occurs and the other cases where the gas discharge extinction phenomenon does not occur.

Figure 6:
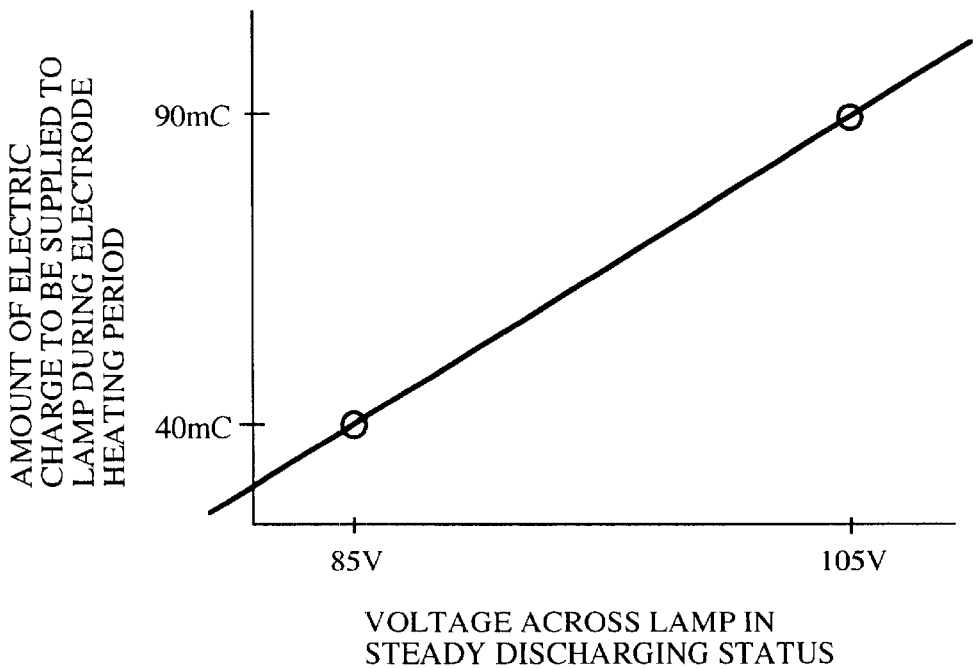
FIG. 6 is a graph showing a required amount of electric charge to be supplied to the gas discharge lamp in the electrode heating state versus a lamp voltage across the lamp that enters a steady discharging state when the lamp is new, and the same electric charge-lamp voltage characteristic when the lamp is old.

The required amount of electric charge to be supplied to the gas discharge lamp during the electrode heating, period is 85 mC for old lamps, and is 38 mC for new lamps, as can be seen from FIGS. 4 and 5. On the other hand, the average lamp voltage is 85V for new lamps put in the steady discharging status and is 105V for old lamps put in the steady discharging status. Therefore, in accordance with the present embodiment, by plotting the required amount of electric charge to be supplied during the electrode heating period for old lamps put in the steady discharging status and the one for new lamps put in the steady discharging status. (i.e., 40 mC in the case of the lamp voltage=85V, 90 mC in the case of the lamp voltage=105V), as shown in FIG. 6, and by connecting the two points with each other by a straight line, when the voltage across the gas discharge lamp 12 put in the steady discharging status lies between 85V and 105V, the required amount of electric charge to be supplied corresponding to the lamp voltage can be obtained by linear-interpolating the straight line. The lamp voltage across the gas discharge lamp put in the steady discharging status is the voltage Vk=(VL−Vc) that appears between the electrodes of the gas discharge lamp 12 when 1 or more minutes pass after the gas discharge lamp is made to light up. By storing the voltage value in the control circuit 14 when the gas discharge lamp was made to light up last time, the control circuit 14 can determine the required amount of electric charge to be supplied to the gas discharge lamp during the electrode heating period according to the stored voltage value.

Figure 7:
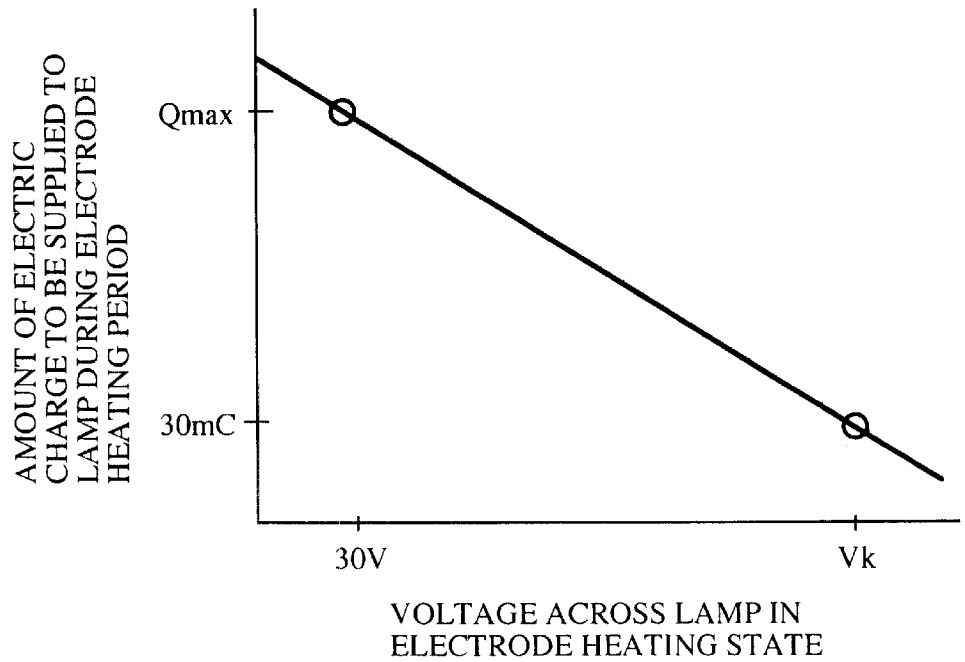

On the other hand, when lighting the gas discharge lamp 12 placed in the hot state, it is not necessary to supply the same amount of electric charge as in the above-mentioned case of lighting the gas discharge lamp placed in the cold state to the gas discharge lamp during the electrode heating period. If the gas discharge lamp is placed in a state closer to the hot state, i.e., the shorter length of time elapses since the previous turning off of the gas discharge lamp, the closer to the lamp voltage Vk across the gas discharge lamp in the steady discharging status the gas discharge lamp in the electrode heating state has after the power supply is turned on. It is determined that when the gas discharge lamp is placed in a state closer to the cold state, the lamp voltage is about 30V during the electrode heating period after the power supply is turned on. In accordance with the first embodiment, the gas discharge lamp lighting device detects the lamp voltage (VL−Vc) during the electrode heating period after the power supply is turned on, and changes the required amount of electric charge to be supplied to the gas discharge lamp during the electrode heating period according to the voltage value, as shown in FIG. 7. When the lamp voltage is 30V, the control circuit sets the amount of electric charge to be supplied to the gas discharge lamp to Qmax (the amount of electric charge to be supplied to the gas discharge lamp which can be obtained based on the graph of FIG. 6), which is determined based on the lamp voltage across the gas discharge lamp put in the steady discharging status. When the lamp voltage is equal to Vk across the gas discharge lamp put in the steady discharging status, the control circuit sets the required amount of electric charge to be supplied to the gas discharge lamp to 30 mC. When the lamp voltage during the electrode heating period lies between 30V and Vk, the control circuit sets the required amount of electric charge to be supplied to the gas discharge lamp by linear-interpolating a straight line connecting the two points with each other, as shown in FIG. 7.

In accordance with the first embodiment, the gas discharge lamp lighting device determines how old the gas discharge lamp is (i.e., the degree of wear in the electrodes of the gas discharge lamp) and the state of the gas discharge lamp (either hot or cold), as mentioned above, by detecting the lamp voltage during the electrode heating period, and then sets the required amount of energy to be supplied to the gas discharge lamp during the electrode heating period. The reason to perform the complex control operation is to extend the longevity of the gas discharge lamp as much as possible. Excessive DC heating of the electrodes of the gas discharge lamp causes excessive wear in the electrodes of the lamp.

It is needless to say that the above-mentioned method of changing the amount of energy to be supplied to the gas discharge lamp during the electrode heating period according to the state of the lamp is applicable to a general gas discharge lamp lighting device including either a full bridge circuit or a half bridge circuit, as mentioned in the description of prior art.

As mentioned above, in accordance with the first embodiment of the present invention, by changing the amount of energy to be supplied to the gas discharge lamp during the electrode heating period according to the lamp voltage, the gas discharge lamp lighting device can prevent the gas discharge extinction phenomenon from occurring when causing the gas discharge lamp to transition from the electrode heating state to the AC discharging state and the polarity of the electric-discharge current is then reversed, and at the beginning of the AC discharging period, thus improving the lighting capability of the gas discharge lamp lighting device.

In accordance with the first embodiment, the gas discharge lamp lighting device can freely set the required amount of energy to be continuously supplied to the gas discharge lamp during the electrode heating period by providing the switching element 11 connected in parallel to the capacitor 9, and can also prevent the gas discharge extinction phenomenon from occurring, when causing the gas discharge lamp to change from the electrode heating state to the AC discharging state and the polarity of the electric-discharge, current is then reversed, and at the beginning of the AC discharging period, thus improving the lighting capability of the gas discharge lamp lighting device.

In accordance with the first embodiment, the gas discharge lamp lighting device can change the required amount of energy to be supplied to the gas discharge lamp during the electrode heating period according to the lamp voltage, and can prevent the gas discharge extinction phenomenon from occurring when causing the lamp to change from the electrode heating state to the AC discharging state and the polarity of the electric-discharge current is then reversed, and at the beginning of the AC discharging period, thus further improving the lighting capability of the gas discharge lamp lighting device.

In accordance with the first embodiment, the gas discharge lamp lighting device includes the start assistance circuit for feeding an initial current to the gas discharge lamp until the power supply unit starts to feed an electric current to the gas discharge lamp when causing the lamp to start discharging, thus preventing the gas discharge extinction phenomenon from occurring due to a shortage of the electric current flowing through the lamp when the lamp starts to discharge, and hence improving the lighting capability of the gas discharge lamp lighting device.

In accordance with the first embodiment, since the gas discharge lamp lighting device includes a resistor located in the energy supply path extending from the start assistance circuit to the gas discharge lamp, the device can introduce a time lag into the electric current flowing through the path, and can maintain the electric current fed into the gas discharge lamp by means of the start assistance circuit until the electric power adjusting unit makes full use of its current-feeding ability, thus preventing the gas discharge extinction phenomenon from occurring due to a shortage of the electric current flowing through the gas discharge lamp when the lamp starts to discharge, and hence further improving the lighting capability of the gas discharge lamp lighting device.

In accordance with the first embodiment, since the start assistance circuit includes the resistor 6a having a resistance value of 2Ω to 100Ω, the start assistance circuit can supply enough energy to the gas discharge lamp for the discharge development, and increase the smallest amount of electric discharge development current up to 0.5 A or more, thus preventing the gas discharge extinction phenomenon from occurring due to a shortage of the electric current flowing through the gas discharge lamp when the lamp starts to discharge, and hence further improving the lighting capability of the gas discharge lamp lighting device.

In accordance with the first embodiment, the gas discharge lamp lighting device includes the igniter circuit that can light the gas discharge lamp.

It accordance with the first embodiment, since the gas discharge lamp lighting device can determine whether the gas discharge lamp is new or not by determining the voltage that appears between the electrodes of the lamp during the AC discharging period when the lamp is made to light up, and can set the required amount of energy to be supplied to the lamp that will be made to light up the next time during the electrode heating period according to the determined lamp condition, the gas discharge lamp lighting device can prevent the gas discharge extinction phenomenon from occurring when causing the gas discharge lamp to change from the electrode heating state to the AC discharging state and the polarity of the electric-discharge current is then reversed, and at the beginning of the AC discharging period while reducing wear in the electrodes of the lamp, thus lengthening the lamp longevity of the gas discharge lamp lighting device and further improving the lighting capability of the gas discharge lamp lighting device.

In accordance with the first embodiment, the gas discharge lamp lighting device can determine the state of the gas discharge lamp (how much time has passed since the last lighting?) by determining the voltage that appears between the electrodes of the lamp during the electrode heating period, and can set the required amount of energy to be supplied to the lamp during the electrode heating period according to the determined lamp state, the gas discharge lamp lighting device can prevent the gas discharge extinction phenomenon from occurring when causing the gas discharge lamp to transition from the electrode heating state to the AC discharging state and the polarity of the electric-discharge current is then reversed, and at the beginning of the AC discharging period while reducing wear in the electrodes of the lamp, thus lengthening the lamp longevity of the gas discharge lamp lighting device and further improving the lighting capability of the gas,discharge lamp lighting device.

Embodiment 2

Figure 8:
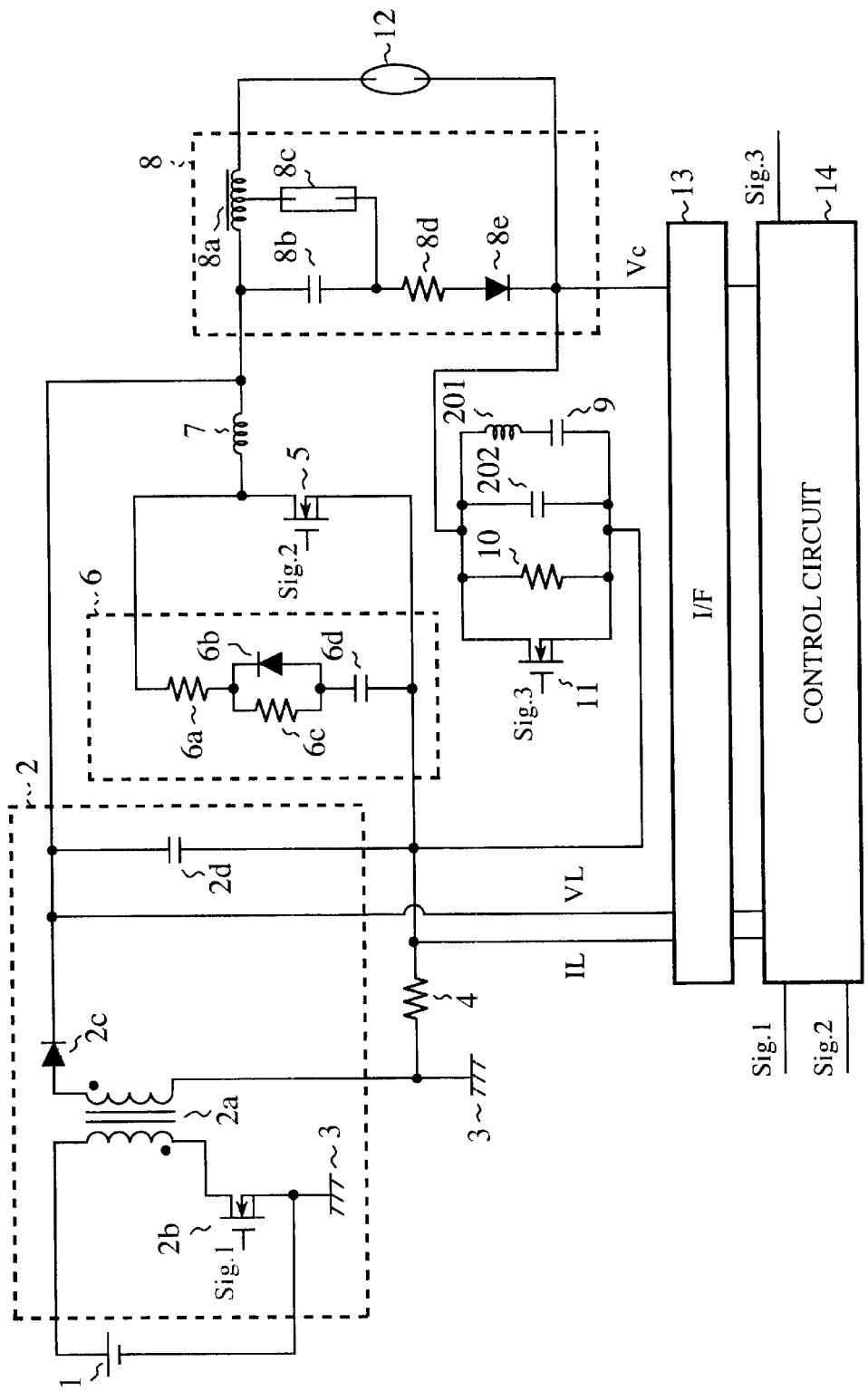
FIG. 8 is a schematic circuit diagram showing the structure of a gas discharge lamp lighting device according to a second embodiment of the present invention.

FIG. 8 is a schematic circuit diagram showing the structure of a gas discharge lamp lighting device according to a second embodiment of the present invention. In FIG. 8, the same reference numerals as shown in FIG. 1 denote the same or like components, and therefore the description of the components will be omitted hereafter. In the figure, reference numeral 201 denotes an inductor, and numeral 202 denotes a capacitor. The inductor 201 and the capacitor 202 are added to generate and apply a high voltage to a gas discharge lamp 12 when a control circuit 14 switches a source of supply of energy to the gas discharge lamp from a DC/DC converter 2 to an electrolytic capacitor 9.

The inductor 201 is connected in series to the electrolytic capacitor 9 such that the inductor is connected between the gas discharge lamp 12 and the electrolytic capacitor 9. The series circuit including the inductor 201 and the electrolytic capacitor 9 is connected in parallel to a resistor 10 and an FET 11. The capacitor 202 is also connected in parallel to the resistor 10 and the FET 11.

The gas discharge lamp lighting device according to the above-mentioned first embodiment optimally sets the amount of energy to be supplied to the gas discharge lamp during the electrode heating period by detecting the state of the lamp, thereby preventing the gas discharge lamp from being extinguished when causing the lamp to change from the electrode heating state to the AC discharging state and the polarity of the electric-discharge current is then reversed. In contrast, in a prior art gas discharge lamp lighting device including a full bridge circuit, even if it does not control the amount of energy to be supplied to the gas discharge lamp during electrode heating period like the above-mentioned first embodiment, the gas discharge extinction phenomenon does not occur easily. This is because the prior art gas discharge lamp lighting device can raise the voltage from the DC/DC converter and apply the raised voltage to the gas discharge lamp when the polarity of the electric-discharge current is reversed. On the other hand, in either of the gas discharge lamp lighting device according to the above-mentioned first embodiment and a prior art gas discharge lamp lighting device including a half bridge circuit and a capacitor, it is impossible to apply a high voltage to the gas discharge lamp within a time period during which energy from the capacitor is supplied to the lamp because the electric discharge with the other polarity is caused by the energy supply from the capacitor. The gas discharge lamp lighting device according to the second embodiment of the present invention further includes a function of generating and applying a high voltage to the gas discharge lamp when switching the source of supply of energy to the lamp from the DC/DC converter 2 to the electrolytic capacitor 9, in addition to the structure according to the above-mentioned first embodiment. In other words, the gas discharge lamp lighting device according to the second embodiment can raise the voltage Vc that appears at one electrode of the gas discharge lamp 12, which is connected to the inductor 201, when switching the source of supply of energy to the gas discharge lamp from the DC/DC converter 2 to the electrolytic capacitor 9.

As shown in FIG. 8, a start assistance circuit 6 is a series circuit in which a parallel circuit comprised of a resistor 6c and a diode 6b connected in parallel to each other, a capacitor 6d, and another resistor 6a are connected in series. As an alternative, the start assistance circuit 6 can be a series circuit in which a parallel circuit comprised of a series circuit including a diode and a resistor connected in series to each other, and another resistor, which are connected in parallel to each other, and a capacitor are connected in series to each other.

Figure 9:
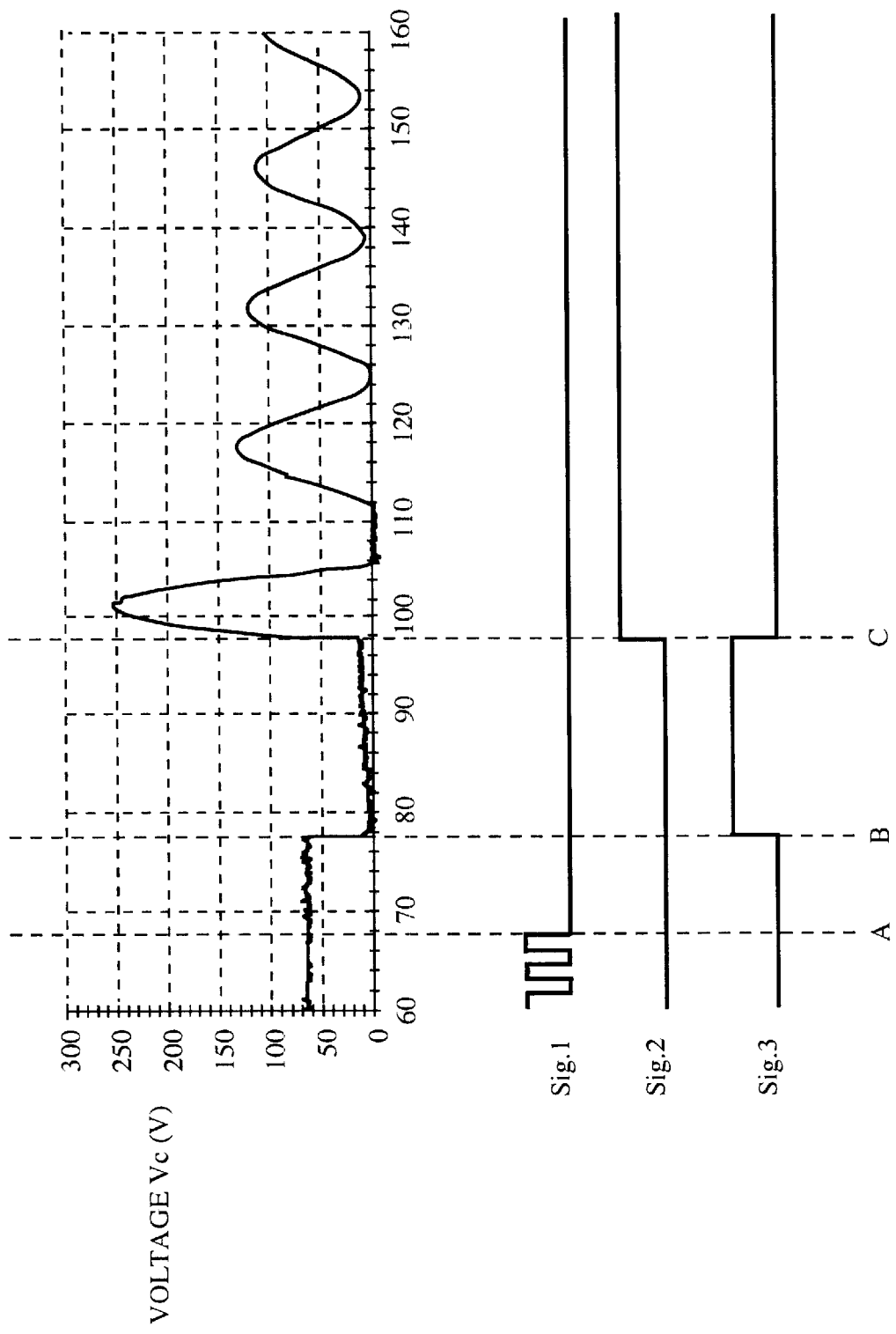
FIG. 9 is a timing chart showing the waveforms of a voltage Vc that appears at one electrode of a gas discharge lamp, which is connected to an inductor, and control signals Sig.1, Sig.2, and Sig.3 generated by a control circuit, in the gas discharge lamp lighting device according to the second embodiment.

FIG. 9 shows the waveforms of a voltage Vc that appears at one electrode of the gas discharge lamp 12, which is connected to the inductor 201, and control signals Sig.1, Sig.2, and Sig.3 generated by the control circuit 14 and applied to the gates of FETs 2b, 5, and 11, respectively, when the control circuit switches the source of supply of energy to the gas discharge lamp from the DC/DC converter 2 to the electrolytic capacitor 9 and the polarity of the electric-discharge current is then reversed. The control circuit 14 causes the control signal Sig.1 to make a high-to-low transition to turn off the FET 2b and hence stop the operation of the DC/DC converter 2 (at A of FIG. 9). After that, the control circuit 14 holds each switching element at the off state until the discharge current decreases to zero. When the discharge current reaches about zero, the control circuit 14 causes the control signal Sig.3 to make a low-to-high transition to turn on the FET 11 (at B of FIG. 9). A part of the energy stored in the electrolytic capacitor 9 moves to the inductor 201 when the FET 11 is turned on. When the electric current flowing through the inductor 201 reaching a given value, the control circuit 14 causes the control signal Sig.3 to make a high-to-low transition and also causes the control signal Sig. 2 to make a low-to-high transition, so as to turn off the FET 11 and turn on the FET. 5 (at C of FIG. 9, which corresponds to D of FIG. 2). The energy stored in the inductor 201 instantly charges up the capacitor 202 having no electric charge and then generates a high voltage with LC resonance (i.e., raises the voltage Vc of one electrode of the gas discharge lamp). When the gas discharge lamp 12 is brought into conduction, the lamp 12 consumes the energy stored in the capacitor 202. It is understood from FIG. 9 that the control operation causing a drop of 65V or more in the voltage Vc results in a rise of 250V in the voltage Vc (a change in the voltage Vc immediately after C of FIG. 9). In accordance with the second embodiment of the present invention, the control circuit 14 can carry out the control operation resulting in such the rapid rise of the voltage Vc when causing the gas discharge lamp to transition from the electrode heating state to the AC discharging state and the polarity of the electric-discharge current is then reversed. While the gas discharge lamp is placed in the AC discharging state and several voltage pulses are supplied to the lamp from the DC/DC converter 2, the control circuit can also carry out the control operation when switching the source of supply of energy to the gas discharge lamp from the DC/DC converter 2 to the electrolytic capacitor 9 and the polarity of the electric-discharge current is then reversed (which corresponds to a time interval between a time period during which a series of pulses is generated as Sig. 1 and a time period during which the pulse generation is stopped while the lamp is placed in the AC discharging state of FIG. 2). This is because the gas discharge extinction phenomenon can easily occur within the time period during which the polarity of the electric-discharge current is reversed.

Figure 10:
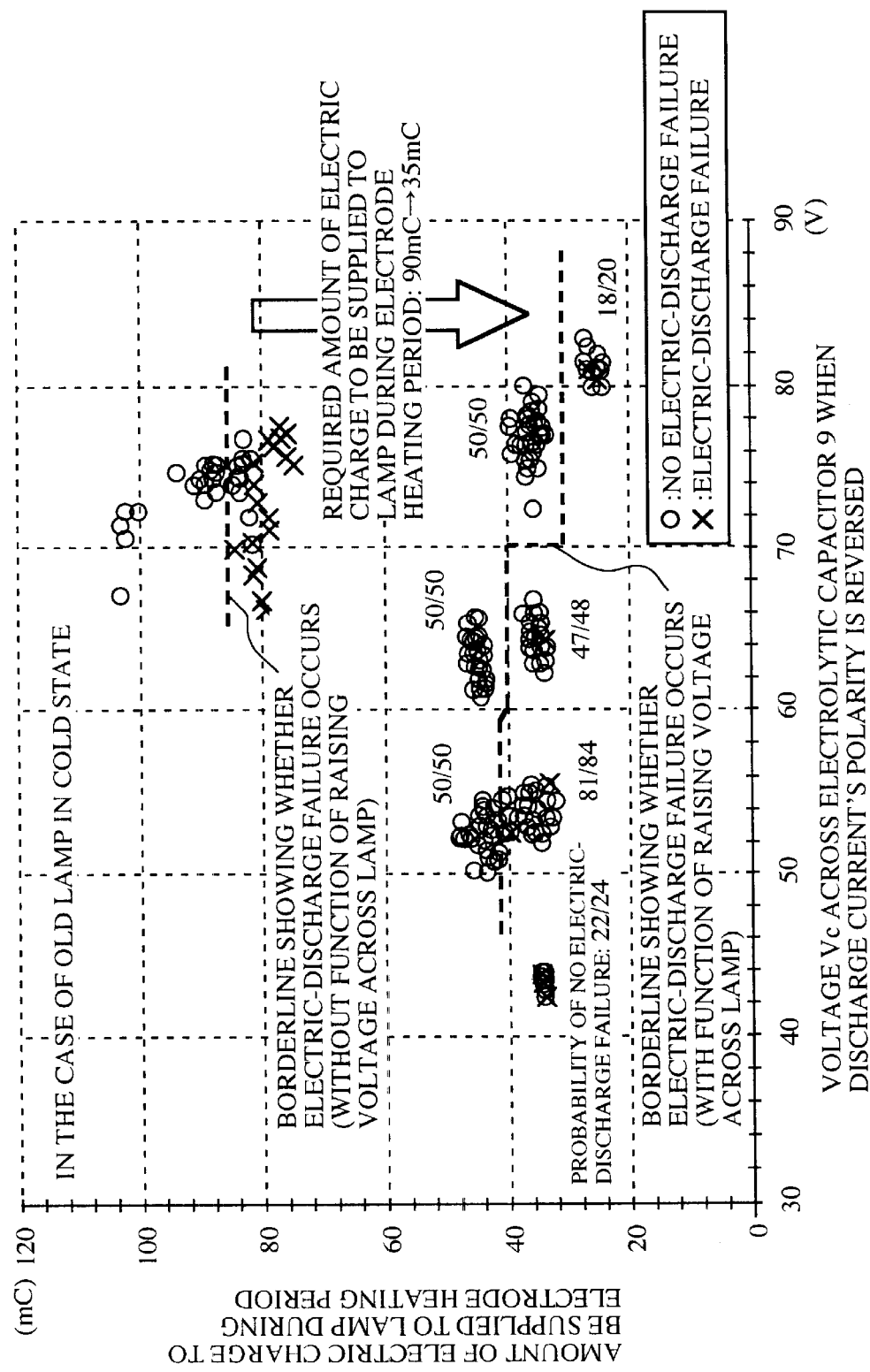
FIG. 10 is a graph showing the effect of raising the voltage across the gas discharge lamp before the lamp is brought to the AC discharging state.

FIG. 10 shows the effect of the voltage raising. It shows results of observing the gas discharge extinction phenomenon that occurs in an old lamp, in which the gas discharge extinction phenomenon can easily occur and which is driven by the gas discharge lamp lighting device according to the second embodiment, when it is made to transition from the electrode heating state to the AC discharging state. FIG. 10 also shows the results, as shown in FIG. 4, of observing the gas discharge extinction phenomenon that occurs in an old lamp, which is driven by the gas discharge lamp lighting device according to the above-mentioned first embodiment, when it is made to transition from the electrode heating state to the AC discharging state. The horizontal axis shows the voltage across the electrolytic capacitor 9 when the polarity of the electric-discharge current is reversed, and the vertical axis shows the amount of electric charge to be supplied to the gas discharge lamp during the electrode heating period. ○ shows a case where the gas discharge extinction phenomenon does not occur (no failure of electric discharge), and X shows a case where the gas discharge extinction phenomenon occurs (a failure of electric discharge). A broken line in the figure shows a borderline that divides the experimental results to the cases where a failure of electric discharge occurs and the other cases where a failure of electric discharge does not occur. It is understood by comparison of the borderline in the case where the voltage raising function is provided with the other borderline in the case where no voltage raising function is provided when the voltage across the electrolytic capacitor 9 at the time of reversing the polarity of the electric-discharge current is in the range of 70V to 80V that a required amount of electric charge to be supplied to the gas discharge lamp during the electrode heating period can be reduced from 85 mC to 35 mC.

In accordance with the second embodiment, the gas discharge lamp lighting device can prevent the gas discharge lamp from being extinguished when causing the gas discharge lamp to transition from the electrode heating state to the AC discharging state and the polarity of the electric-discharge current is then reversed, and when switching the source of supply of energy to the gas discharge lamp from the DC/DC converter 2 to the electrolytic capacitor 9 and the polarity of the electric-discharge current is then reversed at the beginning of the AC discharging period without having to control the amount of energy to be supplied to the gas discharge lamp during the electrode heating period like the above-mentioned first embodiment, as mentioned above. Furthermore, by applying the control of the amount of energy to be supplied to the gas discharge lamp during the electrode heating period according to the above-mentioned first embodiment to the second embodiment, a gas discharge lamp lighting device with a higher degree of reliability can be provided. Needless to say, the second embodiment is applicable to a case where the gas discharge lamp lights up without undergoing the electrode heating period.

Figure 13:
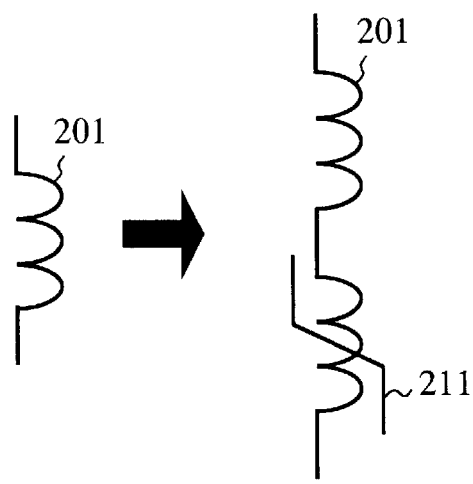
FIG. 13 is a diagram showing a part of a variant of the second embodiment having a structure intended for preventing the gas discharge lamp from being extinguished, thus providing a higher degree of reliability.

FIG. 13 is a schematic circuit diagram showing the structure of a part of a gas discharge lamp lighting device according to a variant of the second embodiment. In addition to the inductor 201 shown in FIG. 8, the gas discharge lamp lighting device according to the variant is further provided with a saturable reactor 211 connected in series to the inductor 201. The other circuit structure of the gas discharge lamp lighting device is the same as that of the above-mentioned second embodiment. The gas discharge lamp lighting device of the variant can prevent the gas discharge lamp from being extinguished when causing the gas discharge lamp to transition from the electrode heating state to the AC discharging state and the polarity of the electric-discharge current is then reversed, and at the beginning of the AC discharging period.

Figure 14:
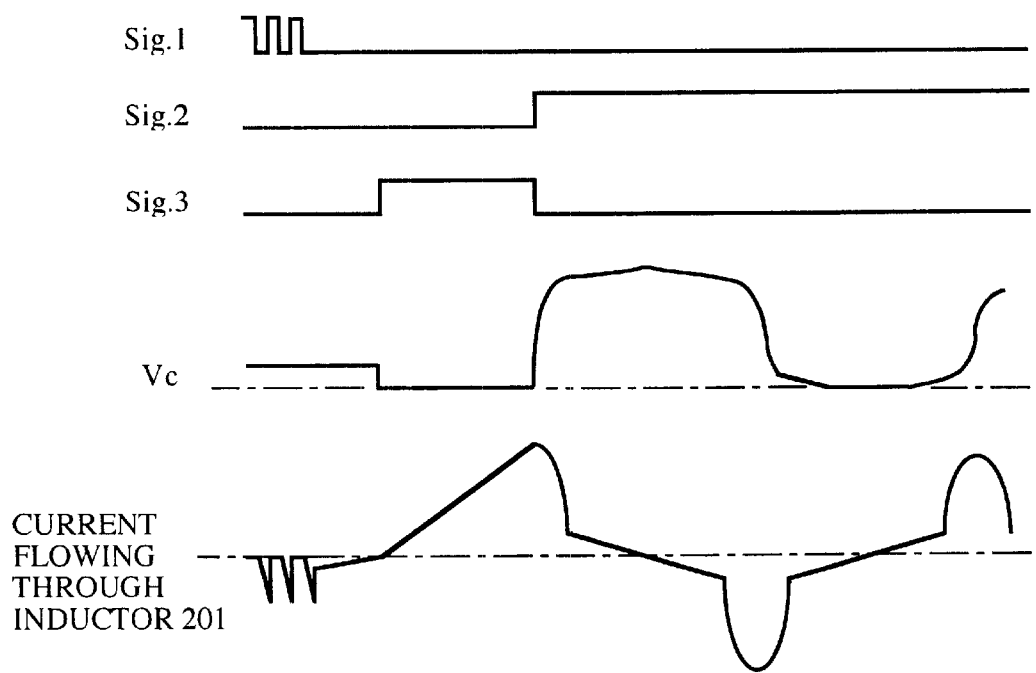
FIG. 14 is a timing chart showing the waveforms of the control signals Sig.1, Sig.2, and Sig.3, the voltage Vc that appears at one electrode of the gas discharge lamp, which is connected to an inductor, an electric current flowing through the inductor when the polarity of the electric-discharge current flowing through the gas discharge lamp is reversed as the control circuit switches a source of supply of energy to the lamp from the DC/DC converter to the electrolytic capacitor, in the gas discharge lamp lighting device according to the variant of the second embodiment of FIG. 13.

FIG. 14 shows the waveforms of the control signals Sig.1, Sig.2, and Sig.3 generated by the control circuit 14, the voltage Vc that appears at one electrode of the gas discharge lamp 12, which is connected to the inductor 201, and an electric current flowing through the inductor 201 when the control circuit switches the source of supply of energy to the gas discharge lamp from the DC/DC converter 2 to the electrolytic capacitor 9 and the polarity of the electric-discharge current is then reversed, like FIG. 9. The saturable reactor 211 does not magnetic-saturate in a low electric current region and has a large inductance value, and has an extremely small inductance value when the electric current flowing through the reactor increases and the reactor magnetic-saturates. Therefore, the series circuit shown in FIG. 13 has a large inductance value in the low electric current region because the inductance value is the sum of that of the inductor 201 and that of the saturable reactor 211. When the electric current exceeds a certain value, the saturable reactor 211 magnetic-saturates and the inductance value of the series circuit becomes equal to the inductance value of the inductor 201.

The waveform of the voltage Vc is different from that according to the above-mentioned second embodiment though the operation of the gas discharge lamp lighting device according to the variant is the same as that of the above-mentioned second embodiment. This is because the saturable reactor 211 is connected in series to the inductor 201 and the time period during which a high voltage is generated is therefore lengthened. In the low electric current region, the inductance value of the series circuit shown in FIG. 13 is large, and the period of vibration of the LC resonance is long. The electric discharge can thus occur more easily since the time period during which the high voltage is applied to the gas discharge lamp is longer than that using only the inductor 201. Therefore, the variant can prevent the gas discharge lamp from being extinguished more effectively at the time when the polarity of the electric-discharge current is reversed.

The above-mentioned second embodiment is applicable to a prior art gas discharge lamp lighting device including a half bridge circuit and a capacitor. In this case, the same advantage is provided.

As mentioned above, in accordance with the second embodiment, the gas discharge lamp lighting device includes the capacitors 9 and 202, the inductor 201, and the switching element 11. The gas discharge lamp lighting device can thus raise the voltage across the electrodes of the gas discharge lamp when causing the gas discharge lamp to transition from the electrode heating state to the AC discharging state and the polarity of the electric-discharge current is then reversed, and when switching the source of supply of energy to the lamp from the DC/DC converter 2 to the electrolytic capacitor 9 and the polarity of the electric-discharge current is then reversed at the beginning of the AC discharging period, by supplying energy from the electrolytic capacitor 9 to the inductor 201, and then transferring the energy stored in the inductor to the other capacitor 202. The second embodiment can therefore offer the same advantage as provided by the above-mentioned first embodiment. In addition, the gas discharge lamp lighting device can prevent the gas discharge lamp from being extinguished when causing the gas discharge lamp to change from the electrode heating state to the AC discharging state and the polarity of the electric-discharge current is then reversed, and when switching the source of supply of energy to the lamp from the DC/DC converter 2 to the electrolytic capacitor 9 and the polarity of the electric-discharge current is then reversed at the beginning of the AC discharging period, thus improving the lighting capability of the gas discharge lamp lighting device.

Embodiment 3

Figure 11:
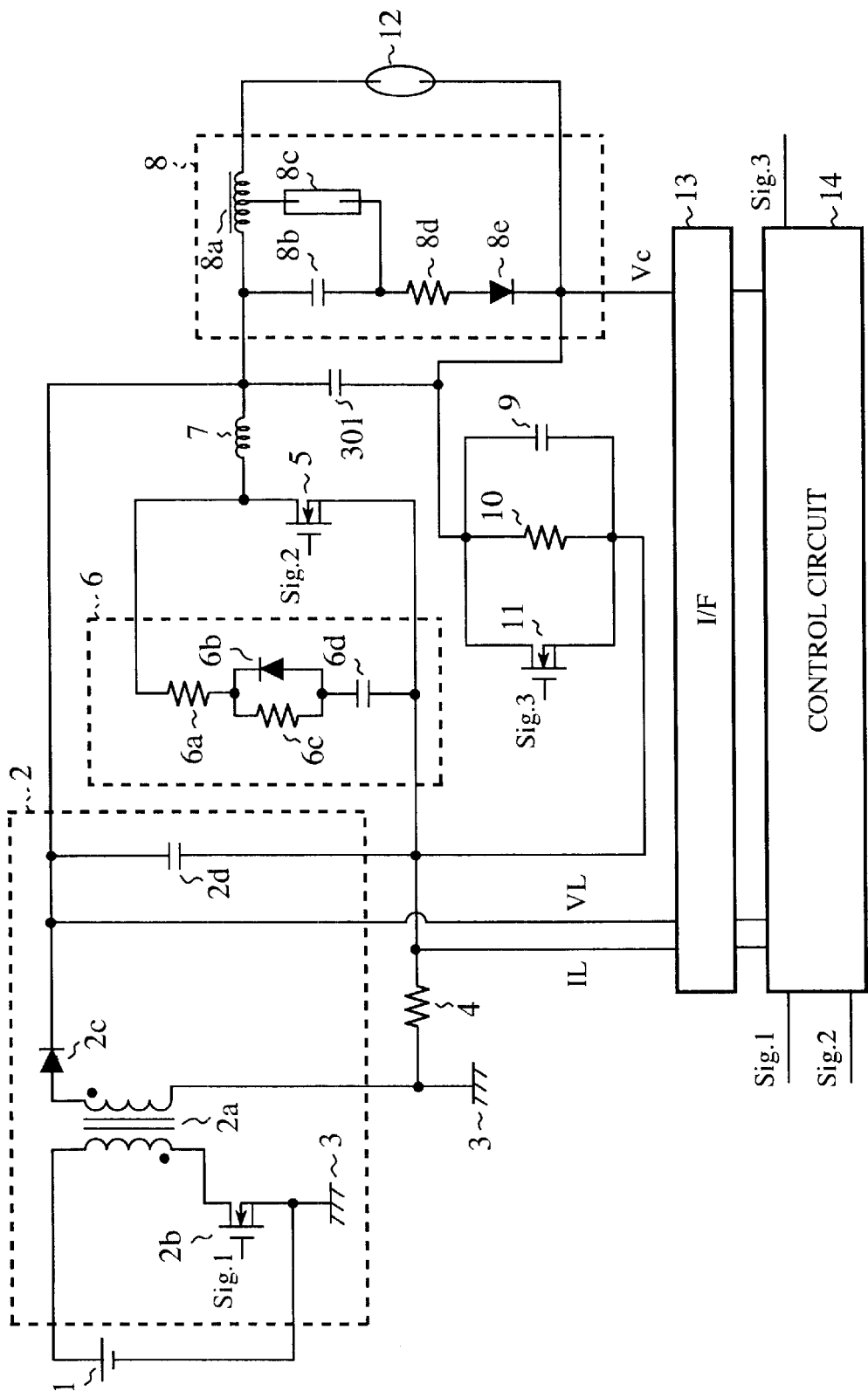
FIG. 11 is a schematic circuit diagram showing the structure of a gas discharge lamp lighting device according to a third embodiment of the present invention.

FIG. 11 is a schematic circuit diagram showing the structure of a gas discharge lamp lighting device according to a third embodiment of the present invention. The gas discharge lamp lighting device according to the third embodiment has a function of generating and applying a high voltage to a gas discharge lamp 12 when a control circuit 14 switches a source of supply of energy to the gas discharge lamp from a DC/DC converter 2 to an electrolytic capacitor 9, i.e., a function of raising and applying a voltage Vc to one electrode of the gas discharge lamp, by using a method different from that according to the above-mentioned second embodiment. In FIG. 11, reference numeral 1 denotes a direct-current power supply, numeral 2 denotes the DC/DC converter, numeral 2a denotes a transformer, numeral 2b denotes an FET which is a switching element, numeral 2c denotes a diode, numeral 2d denotes a capacitor, numeral 3 denotes a ground, numeral 4 denotes a shunt resistor, numeral 5 denotes an FET, numeral 6 denotes a start assistance circuit, 6a denotes a resistor, numeral 6b denotes a diode, numeral 6c denotes a resistor, numeral 6d denotes a capacitor, numeral 7 denotes an inductor, numeral 8 denotes an igniter circuit, numeral 8a denotes a pulse transformer, numeral 8b denotes a capacitor, numeral 8c denotes a gap switch, numeral 8d denotes a resistor, numeral 8e denotes a diode, numeral 9 denotes an electrolytic capacitor, numeral 10 denotes a resistor, numeral 11 denotes an FET, numeral 12 denotes a gas discharge lamp, VL denotes an output voltage from the DC/DC converter 2, Vc denotes a voltage that appears at one electrode of the capacitor 9, IL denotes an electric current flowing through the gas discharge lamp 12, numeral 13 denotes an I/F, and numeral 14 denotes a control circuit. The above-mentioned components are the same as those of the first embodiment. In addition, reference numeral 301 denotes a capacitor intended to raise the voltage across the gas discharge lamp. The capacitor 301 is connected in parallel to the igniter circuit 8 and the gas discharge lamp 12.

As shown in FIG. 11, the start assistance circuit 6 is a series circuit in which a parallel circuit comprised of the resistor 6c and the diode 6b connected in parallel to each other, the capacitor 6d, and the other resistor 6a are connected in series. As an alternative, the start assistance circuit 6 can be a series circuit in which a parallel circuit comprised of a series circuit including a diode and a resistor connected in series to each other, and another resistor, which are connected in parallel to each other, and a capacitor are connected in series to each other.

Figure 12:
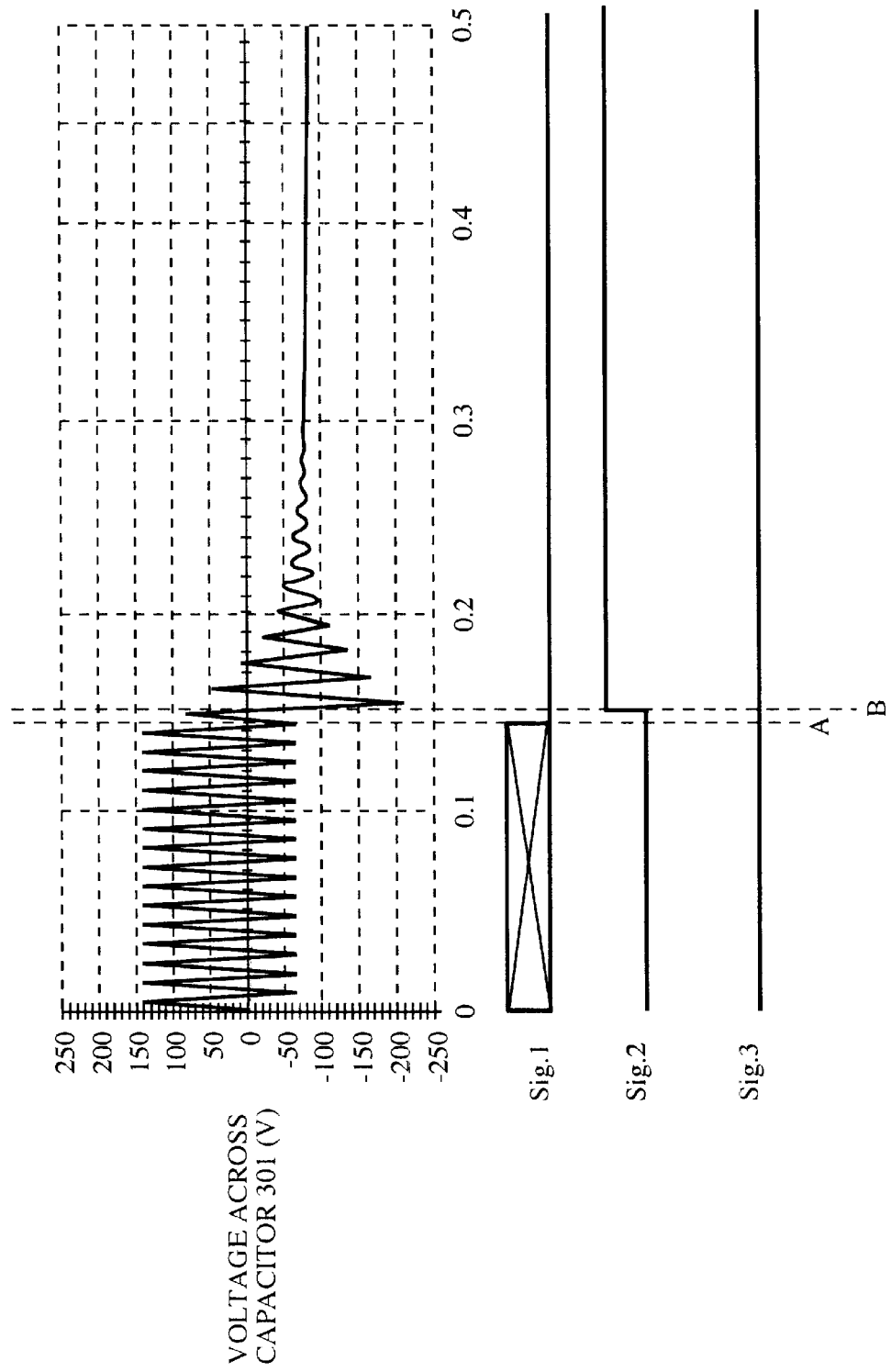
FIG. 12 is a timing chart showing the waveforms of a voltage across a capacitor, and control signals Sig.1, Sig.2, and Sig.3 generated by a control circuit, in the gas discharge lamp lighting device according to the third embodiment.

FIG. 12 shows the waveforms of a voltage across the capacitor 301, and control signals Sig.1, Sig.2, and Sig.3 generated by the control circuit 14 and applied to the gates of the FETs 2b, 5, and 11, respectively, when the control circuit switches the source of supply of energy to the gas discharge lamp from the DC/DC converter 2 to the electrolytic capacitor 9 and the polarity of the electric-discharge current is then reversed. The control circuit 14 causes the control signal Sig.1 to make a high-to-low transition to turn off the FET 2b and hence stop the operation of the DC/DC converter 2 (at A of FIG. 12). After that, when the control circuit 14 causes the control signal Sig.2 to make a low-to-high transition to turn on the FET 5 (at B of FIG. 9), an amount of electric charge (which corresponds to a certain voltage Vp) stored in the capacitor 301 and the electrolytic capacitor, which are connected in series to the inductor 7 and the FET 5, starts to flow through the inductor 7 and the FET 5. At this time, since these circuit elements constitute a series LC circuit, the electric current resonates, and the voltage that appears at one electrode of the capacitor 301 connected to the inductor 7 changes between Vp to −Vp at the maximum. As a result, a high voltage of −Vp−Vc appears between the electrodes of the capacitor 301, and this voltage is applied between the electrodes of the gas discharge lamp 12, where Vc is the one that appears at one electrode of the capacitor 9 connected to the lamp immediately before the FET 5 is turned on, and the electrostatic capacitance of the capacitor 9 >> that of the capacitor 301. It is understood from FIG. 12 that the voltage across the capacitor 301 rises up to −200V. In accordance with the third embodiment of the present invention, the control circuit 14 can carry out the control operation resulting in such the rise of the voltage Vc when causing the gas discharge lamp to transition from the electrode heating state to the AC discharging state and the polarity of the electric-discharge current is then reversed. While the gas discharge lamp is placed in the AC discharging state and several voltage pulses are supplied to the lamp from the DC/DC converter 2, the control circuit can also carry out the control operation when switching the source of supply of energy to the gas discharge lamp from the DC/DC converter 2 to the electrolytic capacitor 9 and the polarity of the electric-discharge current is then reversed (which corresponds to a time interval between a time period during which a series of pulses is generated as Sig.1 and a time period during which the pulse generation is stopped while the gas discharge lamp is placed in the AC discharging state of FIG. 2).

In accordance with the third embodiment, the gas discharge lamp lighting device can prevent the gas discharge lamp from being extinguished when causing the gas discharge lamp to transition from the electrode heating state to the AC discharging state and the polarity of the electric-discharge current is then reversed, and when switching the source of supply of energy to the lamp from the DC/DC converter 2 to the electrolytic capacitor 9 and the polarity of the electric-discharge current is then reversed at the beginning of the AC discharging period without having to control the amount of energy to be supplied to the gas discharge lamp during the electrode heating period like the above-mentioned first embodiment, as mentioned above. Furthermore, by applying the control of the amount of energy to be supplied to the gas discharge lamp during the electrode heating period according to the above-mentioned first embodiment to the third embodiment, a gas discharge lamp lighting device with a higher degree of reliability can be provided. Needless to say, the second embodiment is applicable to a case where the gas discharge lamp lights up without undergoing the electrode heating period.

Figure 15:
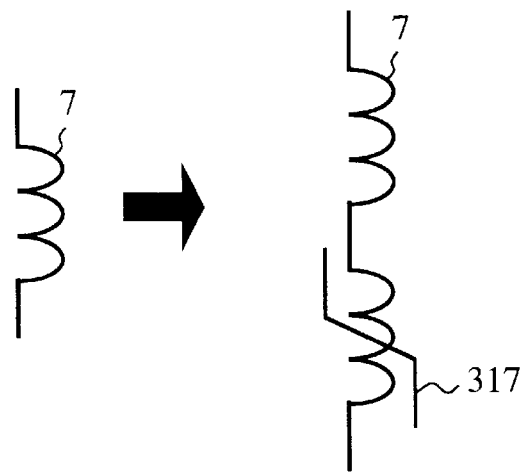
FIG. 15 is a diagram showing a part of a variant of the third embodiment having a structure intended for preventing the gas discharge lamp from being extinguished, thus providing a higher degree of reliability.
Figure 16:
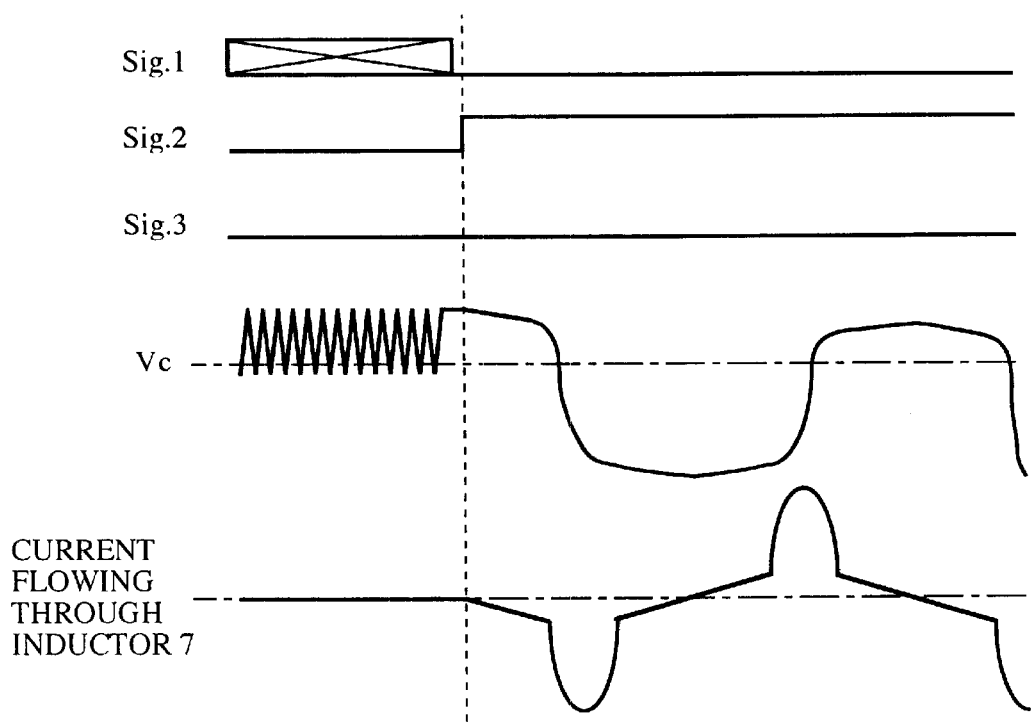
FIG. 16 is a timing chart showing the waveforms of the control signals Sig.1, Sig.2, and Sig.3 generated by the control circuit, the voltage Vc that appears at one electrode of the gas discharge lamp, which is connected to an electrolytic capacitor, an electric current flowing through an inductor when the polarity of the electric-discharge current flowing through the gas discharge lamp is reversed as the control circuit switches a source of supply of energy to the lamp from a DC/DC converter to the electrolytic capacitor, in the gas discharge lamp lighting device according to the variant of the third embodiment of FIG. 15.
Figure 17:
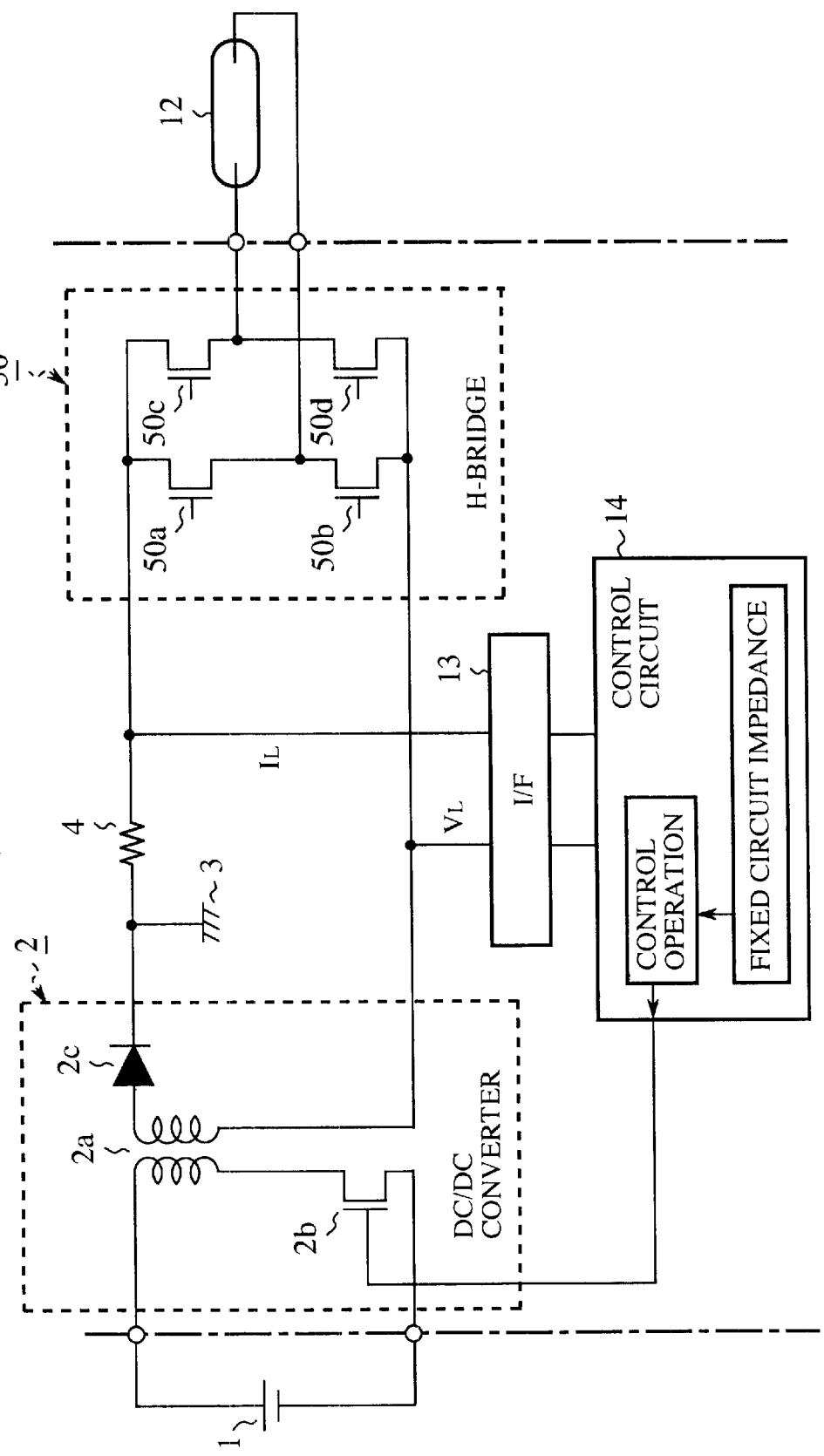
FIG. 17 is a schematic circuit diagram showing the structure of a prior art gas discharge lamp lighting device that employs an H-bridge.
Figure 18:
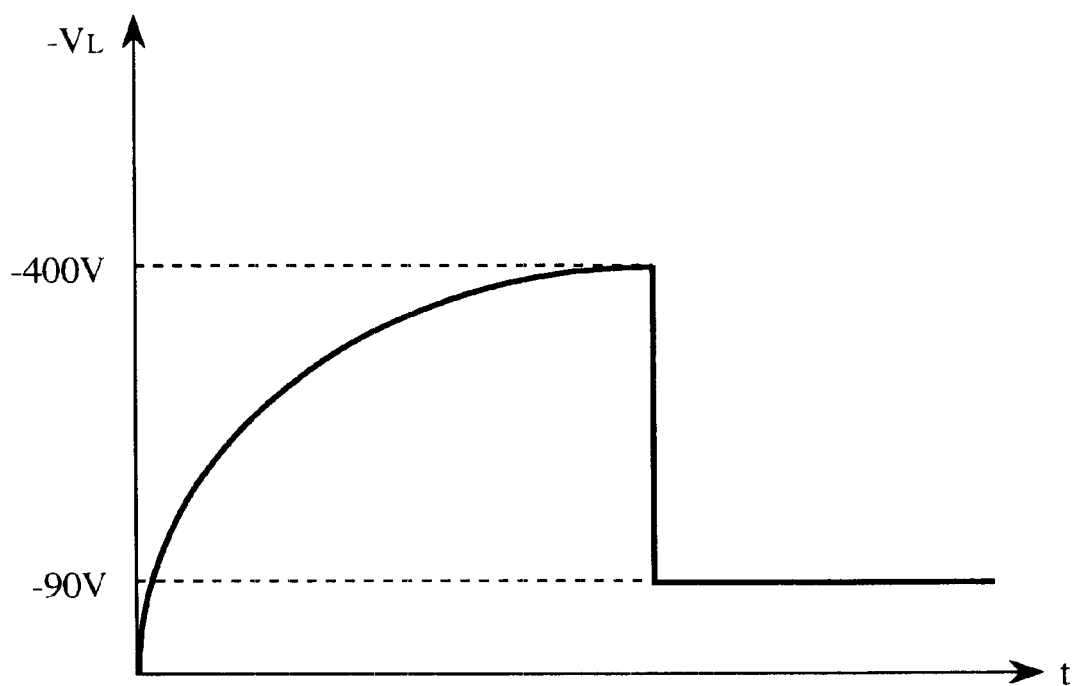
FIG. 18 is a graph showing the waveform of a voltage VL across a gas discharge lamp of the prior art gas discharge lamp lighting device of FIG. 17.
Figure 19:
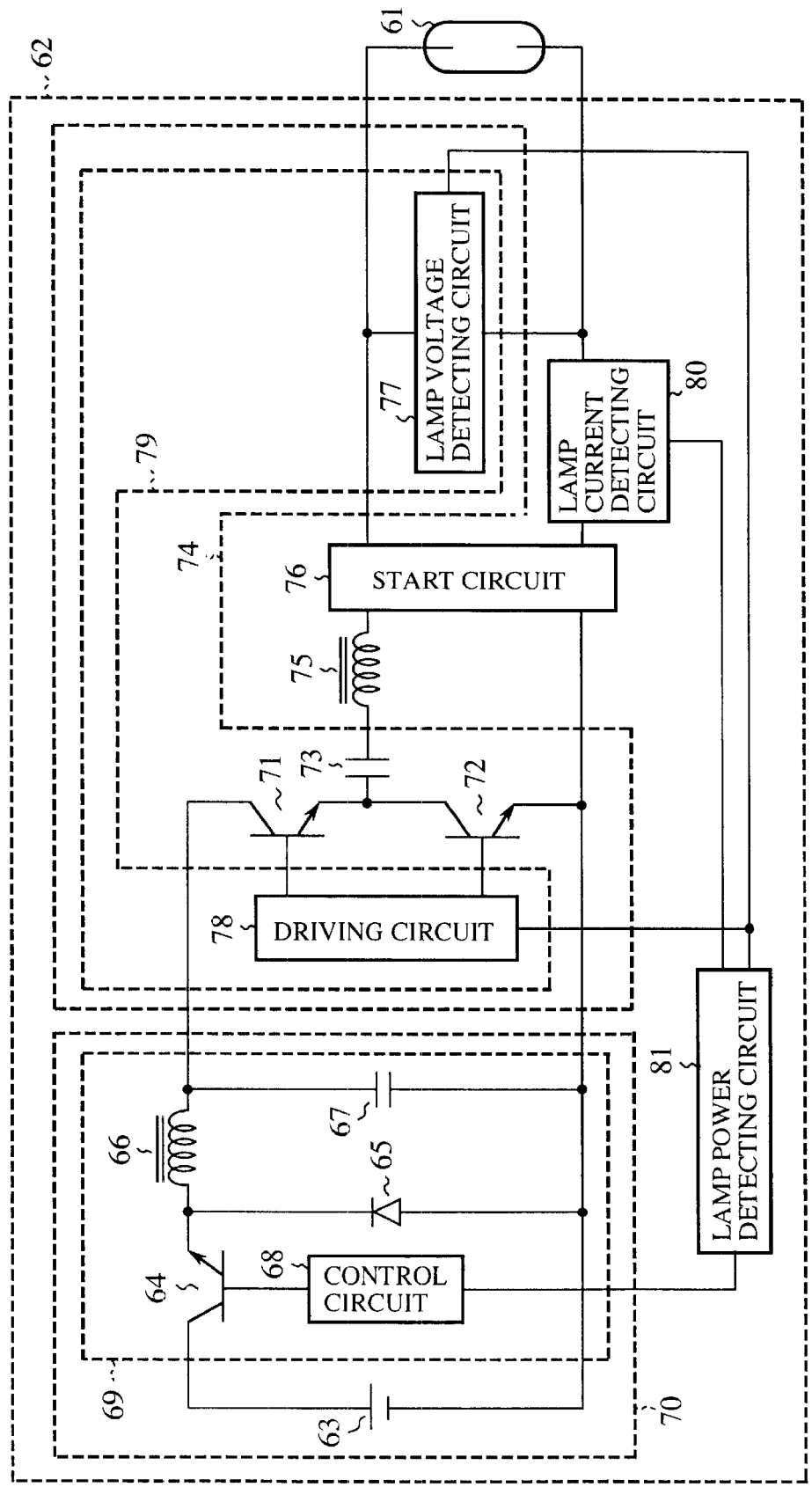
FIG. 19 is a schematic circuit diagram showing the structure of another prior art gas discharge lamp lighting device that drives a gas discharge lamp by applying an AC voltage to the lamp using two semiconductor switching elements and a capacitor.

FIG. 15 is a schematic circuit diagram showing the structure of a part of a gas discharge lamp lighting device according to a variant of the third embodiment. In addition to the inductor 7 shown in FIG. 11, the gas discharge lamp lighting device according to the variant is further provided with a saturable reactor 317 connected in series to the inductor 7. The other circuit structure of the gas discharge lamp lighting device is the same as that of the above-mentioned third embodiment. The gas discharge lamp lighting device of the variant can prevent the gas discharge lamp from being extinguished when causing the gas discharge lamp to transition from the electrode heating state to the AC discharging state and the polarity of the electric-discharge current is then reversed, and at the beginning of the AC discharging period. FIG. 16 shows the waveforms of the control signals Sig.1, Sig.2, and Sig.3 generated by the control circuit 14, the voltage Vc that appears at one electrode of the gas discharge lamp 12, which is connected to the electrolytic capacitor 9, and an electric current flowing through the inductor 7 when the control circuit switches the source of supply of energy to the lamp from the DC/DC converter 2 to the electrolytic capacitor 9 and the polarity of the electric-discharge current is then reversed, like FIG. 12.

The waveform of the voltage Vc is different from that according to the above-mentioned third embodiment though the operation of the gas discharge lamp lighting device according to the variant is the same as that of the above-mentioned third embodiment. This is because the saturable reactor 317 is connected in series to the inductor 7 and the time period during which a high voltage is generated is therefore lengthened. In the low electric current region, the inductance value of the series circuit shown in FIG. 15 is large, and the period of vibration of the LC resonance is long. The electric discharge can thus occur more easily since the time period during which the high voltage is applied to the gas discharge lamp is longer than that using only the inductor 7. Therefore, the variant can prevent the gas discharge lamp from being extinguished more effectively at the time when the polarity of the electric-discharge current is reversed.

The above-mentioned third embodiment is applicable to a prior art gas discharge lamp lighting device including a half bridge circuit and a capacitor. In this case, the same advantage is provided.

As mentioned above, in accordance with the third embodiment, the gas discharge lamp lighting device includes the inductor 7 and the capacitor 301 connected in parallel to the igniter circuit 8 and the gas discharge lamp 12. The gas discharge lamp lighting device can thus raise the voltage across the capacitor 301, i.e., the voltage applied between the electrodes of the gas discharge lamp with the LC series resonance by making electric charge stored in the electrolytic capacitor 9 and the capacitor 301 flow through the inductor 7 when causing the gas discharge lamp to transition from the electrode heating state to the AC discharging state and the polarity of the electric-discharge current is then reversed, and when switching the source of supply of energy to the lamp from the DC/DC converter 2 to the electrolytic capacitor 9 and the polarity of the electric-discharge current is then reversed at the beginning of the AC discharging period. The second embodiment can therefore offer the same advantage as provided by the above-mentioned first embodiment. In addition, the gas discharge lamp lighting device can prevent the gas discharge lamp from being extinguished when causing the gas discharge lamp to transition from the electrode heating state to the AC discharging state and the polarity of the electric-discharge current is then reversed, and at the beginning of the AC discharging period, thus improving the lighting capability of the gas discharge lamp lighting device.

In accordance with the third embodiment, the gas discharge lamp lighting device can freely set the required amount of energy to be continuously supplied to the gas discharge lamp during the electrode heating period by providing the switching element 11 connected in parallel to the capacitor 9, and can also prevent the gas discharge extinction phenomenon from occurring when causing the gas discharge lamp to transition from the electrode heating state to the AC discharging state and the polarity of the electric-discharge current is then reversed, and at the beginning of the AC discharging period, thus improving the lighting capability of the gas discharge lamp lighting device.

Many widely different embodiments of the present invention may be constructed without departing from the spirit and scope of the present invention. It should be understood that the present invention is not limited to the specific embodiments described in the specification, except as defined in the appended claims.

What is claimed is:

1. A gas discharge lamp lighting device for lighting a gas discharge lamp having a pair of electrodes, the device comprising:

electric power adjusting means for adjusting electric power supplied from a power supply to generate and output a DC voltage;

gas discharge lamp driving means electrically connected to said electric power adjusting means, for converting the DC voltage from said electric power adjusting means to an AC voltage to be supplied to a gas discharge lamp; and control means for bringing the gas discharge lamp to an electrode heating state in which both electrodes of the gas discharge lamp are heated after supplying the AC voltage to the gas discharge lamp, for controlling energy supplied to the gas discharge lamp in an electrode heating state according to a voltage across the gas discharge lamp, and for bringing the gas discharge lamp to an AC discharging state in which an AC current flows through the gas discharge lamp after the energy has been supplied to the gas discharge lamp, wherein said gas discharge lamp driving means comprises a first output terminal connected to a first electrode of the gas discharge lamp, a second output terminal coupled to a second electrode of the gas discharge lamp, a first capacitor connected between the first output terminal of the said gas discharge lamp driving means and the first electrode of the gas discharge lamp; and a switching element connected in parallel with said first capacitor, turned on or turned off under control of said control means, said control means turning on said switching element and supplying a controlled amount of energy to the gas discharge lamp, and, subsequently, turning off said switching element to charge said first capacitor and bring the gas discharge lamp to the AC discharging state when a voltage across said first capacitor reaches a threshold voltage, thereby controlling the energy supplied to the gas discharge lamp in the electrode heating state.

2. The gas discharge lamp lighting device according to claim 1, further comprising an initial current supplying means electrically connected between said electric power adjusting means and said gas discharge lamp driving means, for supplying an initial current to the gas discharge lamp when the gas discharge lamp starts to discharge.

3. The gas discharge lamp lighting device according to claim 2, wherein said initial current supplying means is one of (i) a series circuit including a parallel circuit of a first resistor and a diode connected in parallel to each other, and a second capacitor and a second resistor connected in series to the parallel circuit, and (ii) a series circuit including a parallel circuit of a first resistor and a series circuit having a second resistor and a diode connected in series to each other, connected in parallel to the first resistor, and a second capacitor connected in series with the parallel circuit.

4. The gas discharge lamp lighting device according to claim 3, wherein said second resistor has a resistance value ranging from 2Ω to 100Ω.

5. The gas discharge lamp lighting device according to claim 1, further comprising an igniter circuit for generating a high voltage based on the DC voltage from said electric power adjusting means when the gas discharge lamp starts to discharge, and for applying the high voltage to the gas discharge lamp.

6. The gas discharge lamp lighting device according to claim 1, wherein said control means detects the voltage across the gas discharge lamp when the gas discharge lamp is placed in the AC discharging state to control the energy supplied to the gas discharge lamp that will be lighted and will be placed in the electrode heating state according to the voltage detected.

7. The gas discharge lamp lighting device according to claim 1, wherein said control means detects the voltage across the gas discharge lamp when the gas discharge lamp is placed in the electrode heating state to control the energy supplied to the gas discharge lamp according to the voltage detected.

8. The gas discharge lamp lighting device according to claim 1, further comprising high voltage generating means for generating and applying a high voltage to the gas discharge lamp to prevent the gas discharge lamp from being extinguished.

9. The gas discharge lamp lighting device according to claim 8, wherein said high voltage generating means includes a second capacitor and an inductor connected in series with said first capacitor, and a series circuit including said first capacitor and said inductor is connected in parallel with said switching element and said second capacitor.

10. A gas discharge lamp lighting device for lighting a gas discharge lamp having a pair of electrodes, the device comprising:

electric power adjusting means for adjusting electric power supplied from a power supply to generate and output a DC voltage;

switching means electrically connected to said electric power adjusting means and having two output terminals, a first output terminal being connected to a first electrode of a gas discharge lamp, and a second output terminal being connected to a second electrode of the gas discharge lamp, for electrically connecting the first and second output terminals to each other in response to a control signal applied thereto, and for converting the DC voltage from said electric power adjusting means to an AC voltage to be supplied to the gas discharge lamp;

a first capacitor connected between the first output terminal of said switching means and the first terminal of the gas discharge lamp which are electrically connected to each other;

control means for charging said first capacitor while supplying the DC voltage to the gas discharge lamp to make the gas discharge lamp discharge, and for stopping supply of the DC voltage to the gas discharge lamp before bringing the gas discharge lamp to an AC discharging state in which an AC current flows through the gas discharge lamp, and then delivering the control signal to said switching means to supply energy stored in said first capacitor to the gas discharge lamp; and high voltage generating means for generating and applying a high voltage to the gas discharge lamp to prevent the gas discharge lamp from being extinguished when said control means controls supply of the energy stored in said first capacitor to the gas discharge lamp.

11. The gas discharge lamp lighting device according to claim 10, wherein said switching means comprises a switching element connected in parallel with said first capacitor and that is turned on or turned off under control of said control means, and said high voltage generating means includes a second capacitor and an inductor connected in series with said second capacitor, and a series circuit including said second capacitor and said inductor is connected in parallel with said switching element and said first capacitor.

12. The gas discharge lamp lighting device according to claim 11, wherein said high voltage generating means further includes a saturable reactor connected in series with said inductor.

13. The gas discharge lamp lighting device according to claim 10, wherein said high voltage generating means includes a second capacitor having a capacitance smaller than that of said first capacitor and having two electrodes electrically connected to respective electrodes of the gas discharge lamp, and an inductor connected in series with said first and second capacitors.

14. The gas discharge lamp lighting device according to claim 13, wherein said high voltage generating means further includes a saturable reactor connected in series with said inductor.

15. The gas discharge lamp lighting device according to claim 10, wherein said control means brings the gas discharge lamp to an electrode heating state in which the electrodes of the gas discharge lamp are heated after the gas discharge lamp starts to discharge, controls energy supplied to the gas discharge lamp placed in the electrode heating state according to a voltage across the gas discharge lamp, and brings the gas discharge lamp to an AC discharging state in which an AC current flows through the gas discharge lamp after the controlled amount of energy has been supplied to the gas discharge lamp.

16. The gas discharge lamp lighting device according to claim 15, further comprising a switching element connected in parallel with said first capacitor and that is turned on or turned off under control of said control means, wherein, in order to control the energy supplied to the gas discharge lamp in the electrode heating state, said control means turns on said switching element and supplies a fixed amount of energy to the gas discharge lamp, and, after that, turns off said switching element to charge said first capacitor and brings the gas discharge lamp to the AC discharging state when a voltage across said first capacitor reaches a threshold voltage.

17. The gas discharge lamp lighting device according to claim 16, wherein said control means detects the voltage across the gas discharge lamp when the gas discharge lamp is placed in the AC discharging state to control the energy supplied to the gas discharge lamp that will be lighted and will be placed in the electrode heating state according to the voltage detected.

18. The gas discharge lamp lighting device according to claim 16, wherein said control means detects the voltage across the gas discharge lamp when the gas discharge lamp is in the electrode heating state to control the energy supplied to the gas discharge lamp according to the voltage detected.

* * * * *